(12) United States Patent
Senba et al.

(10) Patent No.: US 7,088,249 B2
(45) Date of Patent: Aug. 8, 2006

(54) HOUSING STRUCTURE FOR RFID TAG, INSTALLATION STRUCTURE FOR RFID TAG, AND COMMUNICATION USING SUCH RFID TAG

(75) Inventors: Fujio Senba, Tokyo (JP); Nakamaro Hyodo, Tokyo (JP); Jun Fujii, Tokyo (JP); Tomoki Uchiyama, Tokyo (JP); Shigeru Kida, Tokyo (JP)

(73) Assignee: Hanex Co., Ltd., Tokyo (JP)

( * ) Notice: Subject to any disclaimer, the term of this patent is extended or adjusted under 35 U.S.C. 154(b) by 483 days.

(21) Appl. No.: 10/311,636

(22) PCT Filed: Jul. 13, 2001

(86) PCT No.: PCT/JP01/06083

§ 371 (c)(1),
(2), (4) Date: Feb. 24, 2003

(87) PCT Pub. No.: WO02/07078

PCT Pub. Date: Jan. 24, 2002

(65) Prior Publication Data

US 2004/0074974 A1    Apr. 22, 2004

(30) Foreign Application Priority Data

Jul. 19, 2000  (JP)  .............................. 2000-218443
Aug. 2, 2000   (JP)  .............................. 2000-233888

(51) Int. Cl.
*G08B 13/14*  (2006.01)
(52) U.S. Cl. .............................. 340/572.8; 340/572.7; 343/715; 343/788; 343/873
(58) Field of Classification Search .. 340/572.1–572.8; 343/866, 872, 873, 788
See application file for complete search history.

(56) References Cited

U.S. PATENT DOCUMENTS 3,729,740 A * 4/1973 Nakahara et al. ........... 343/713

(Continued)

FOREIGN PATENT DOCUMENTS

EP    0 986 024 A2    3/2000

(Continued)

*Primary Examiner*—Jeffery Hofsass
*Assistant Examiner*—Hoi C. Lau
(74) *Attorney, Agent, or Firm*—Oliff & Berridge, PLC

(57) ABSTRACT

A first object of the present invention resides in providing a novel installation structure for an RFID tag, which effectively protects the RFID tag from external stress or impact during the storage, transportation and usage, and allows communication with the external.

A second object of the present invention resides in that providing a novel installation structure for an RFID tag, which enables communication with the external even if the RFID tag is installed on a conductive member such as a metal member, and the surface thereof is covered with a protective member typically made of a metal which has an excellent strength and durability.

A third object of the present invention is to provide a communication method using an RFID tag as being surrounded by a conductive member typically made of a metal.

Even if an RFID tag 1a is housed in a container A typically made of a conductive material such as a metal having a large mechanical strength, the RFID tag 1a can communicate with an external read/write terminal 9 as mediated by leakage magnetic flux if only a flux leakage path 12 composed for example of a gap is formed in such container A.

19 Claims, 30 Drawing Sheets

U.S. PATENT DOCUMENTS

| | | |
|---|---|---|
| 4,536,714 A | 8/1985 | Clark |
| 5,084,699 A * | 1/1992 | DeMichele ............. 340/10.34 |
| 5,481,262 A * | 1/1996 | Urbas et al. ........... 340/870.17 |
| 5,767,789 A * | 6/1998 | Afzali-Ardakani et al. 340/10.1 |
| 5,864,323 A * | 1/1999 | Berthon .................... 343/788 |
| 6,166,638 A * | 12/2000 | Brady et al. ............ 340/572.7 |
| 6,411,581 B1 * | 6/2002 | Saitou et al. ............... 720/652 |

FOREIGN PATENT DOCUMENTS

| | | |
|---|---|---|
| JP | 08279714 A | 10/1996 |
| JP | 2001208875 A | 8/2001 |

* cited by examiner

HOUSING STRUCTURE FOR RFID TAG, INSTALLATION STRUCTURE FOR RFID TAG, AND COMMUNICATION USING SUCH RFID TAG

CROSS-REFERENCE TO RELATED APPLICATION

The entire disclosure of Japanese patent application No. 2000-218443 filed on Jul. 19, 2000 and No. 2000-233888 filed on Aug. 2, 2000, including the specification, claims, accompanying drawings and abstract of the disclosure is incorporated herein by reference in its entirety, in order to claim priority right according to 35 U.S.C. §119.

FIELD OF THE INVENTION

The present invention relates to a housing structure, an installation structure and an installation method in which an RFID having an antenna coil and a control section

DESCRIPTION OF THE RELATED ART

Conventional RFID (Radio Frequency IDentification) tags are roughly classified into those of the electromagnetic induction type and the electromagnetic coupling type; both of which are designed to communicate in a non-contact manner with a read/write terminal or so using electromagnetic wave.

The RFID tag has an antenna coil and a control section, in which a signal sent from the read/write terminal is received by the antenna coil, converted by the control section into an electric power and stored in a capacitor, and using such electric power the antenna coil sends information such as an ID code stored in a memory section back to the read/write terminal.

There are two representative send/receive systems—ASK system and FSK system; where the send/receive operation of the former is based on amplitude shift keying, and the latter on frequency shift keying.

The antenna coils of the general RFID tags can be classified by types into those having a disk shape using a circular air-core coil, and those having cylindrical shape using a ferrite core rod and enameled wire wound around such core. The appearances of these tags depend on the shapes of the individual antenna coils, that is, the former appears as a disk, and the latter as a rod.

The RFID tag having a disk-shaped antenna coil performs communication based on changes in magnetic flux in the in-plane direction of a circular coil, and the RFID tag having a cylindrical antenna coil performs communication based on changes in magnetic flux in the axial direction of such tag.

Although most surroundings of the RFID tags are covered by a container or the like for protection from external stress or impact during storage, transportation, and usage, a conductive material being a barrier of communication could not be used as a material of the container for enabling the RFID tag to perform communication with a read/write terminal or the like from outside of the container; therefore, a non conductive material such as plastic was generally used as the material of the container.

However, the container formed with a non-conductive material such as plastic raised a problem regarding endurance since the container is rather low resistant against outer force. For example, in a case where the RFID tags contained respectively inside plastic containers are attached to numerous steel plates and individually managed, the steel plates tend to drop, fall or crumble during transportation or storage causing damage to the plastic containers and leading to a fear of damage of the RFID tag inside the plastic container.

Electromagnetic wave can now be referred as alternating electric field and magnetic field simultaneously propagating while being oscillating in planes normal to each other. When alternating magnetic flux ascribable to changes in the magnetic field is intersected by a conductive member such as those made of iron, aluminum or copper, such conductive member internally generates eddy current, and such eddy current generates counter magnetic flux in a direction canceling such alternating magnetic flux.

Hence, it has been a general practice to install the RFID tag apart as possible from the conductive member.

Further, although a surface of the installed RFID tag requires to be covered by a protective member for protection from outside stress or shock, a conductive material being a barrier of communication could not be used as a material of the protective member for enabling the RFID tag to perform communication with a read/write terminal or the like outside of the protective member; therefore, a non conductive material such as plastic was generally used as the material of the container.

Nevertheless, since a strength of a non-conductive material such as plastic is relatively low, a protection of the RFID tag was often insufficient. For example, in a case where an RFID tag is placed to a lid or the like of a metallic manhole, a problem regarding endurance of the RFID tag is raised since the RFID tag is continuously subject to a weight of the traffic of passing vehicles and the like.

SUMMARY OF THE INVENTION

The present invention is to solve the foregoing problems, and a first object thereof resides in providing a novel installation structure for an RFID tag, which effectively protects the RFID tag from external stress or impact during the storage, transportation and usage, and allows communication with the external.

A second object of the present invention resides in that providing a novel installation structure for an RFID tag, which enables communication with the external even if the RFID tag is installed on a conductive member such as a metal member, and the surface thereof is covered with a protective member typically made of a metal which has an excellent strength and durability.

A third object of the present invention is to provide a communication method using an RFID tag as being surrounded by a conductive member typically made of a metal.

The present inventors found out that, even if an RFID tag is housed in a container typically made of a conductive material such as a metal having a large mechanical strength, the RFID tag can communicate with an external read/write terminal as mediated by leakage magnetic flux if only a flux leakage path composed for example of a gap is formed in such container. The present invention was completed based on such novel finding.

Sensitivity in communication between the RFID tag and a read/write terminal as mediated by electromagnetic wave is largely affected by intrinsic sensitivities of such instruments. A considerable progress has, however, been made in sensitivity of recent RFID tags and read/write terminals, which allows practical communication only at a weak magnetic flux.

Based on such technical background, the present inventors have found after extensive researches and experiments that, although housing an RFID tag in a container made of a conductive material allows a part of magnetic flux to attenuate being affected by such container, the residual part of the magnetic flux can extend in a space confined in such container; and providing a flux leakage path to such container can allow another part of such magnetic flux in such space to leak therethrough to the outside.

Such leakage magnetic flux was found to be valuable enough for enabling practical communication.

The present inventors have also found that, although installing an RFID tag to a conductive member allows a part of magnetic flux to attenuate being affected thereby, the residual part of the magnetic flux can distribute in a space over the installation plane of such conductive member, which can mediate communication with an external read/write terminal; and that even if the surface side of the RFID tag is covered with a protective member made of a conductive material, providing a flux leakage path comprising a fine gap between such protective member and the conductive member allows a part of such magnetic flux to leak therethrough to the outside, which can mediate the communication. These findings let the inventors to complete the present invention.

The present inventors still also found that, even if an RFID tag is surrounded by a conductive member such as a metal member, forming a flux leakage path to a part of such conductive member allows communication between the inside and the outside of such conductive member; such novel finding led the inventors to complete the present invention.

Again based on such finding, the present inventors have found after extensive researches and experiments that, although surrounding an RFID tag by a conductive material allows a part of magnetic flux to attenuate being affected by such container, the residual part of the magnetic flux can extend in a space confined in such container; and providing a flux leakage path to such conductive member can allow another part of such magnetic flux in such space to leak therethrough to the outside.

Such leakage magnetic flux was found to be valuable enough for enabling practical communication.

To accomplish the foregoing object, a housing structure of an RFID tag according to the present invention is such that housing an RFID tag having an antenna coil and a control section in a container made of a conductive member, where the container is provided with a flux leakage path.

According to such constitution, a part of magnetic flux comes out from the RFID tag can leak out from the flux leakage path, while being affected by the container made of a conductive material, and the leakage magnetic flux is responsible for mediating communication with an external read/write terminal.

On the other hand, a part of magnetic flux composing electromagnetic wave and is emitted from the read/write terminal comes through the flux leakage path to reach the antenna coil of the RFID tag and is detected thereby.

According to such constitution, even if the RFID tag is protected with a container made of a conductive member having an excellent mechanical strength, the RFID tag can communicate with the outside of the container using the leakage magnetic flux through the flux leakage path provided to such container.

The container may be composed of a plurality of separable members, and the flux leakage path may be provided to the separation planes thereof or in at least one of such separable members. This will facilitate inspection and replacement of the RFID tag to be housed in such container.

The separable members composing the container can be a main housing portion having an opening and a lid portion capable of closing such opening, and the lid portion may be fixed to the housing portion with a fixing means. This will facilitate formation of the flux leakage path to the separation planes, and also facilitates placement of the RFID tag into such container.

The lid portion may be fixed to the housing portion with the fixing means while being interposed with a spacer made of a non-conductive material. This will facilitate formation of the flux leakage path in an arbitrary dimension.

In either one of the housing structures described in the above, a shock absorber or a heat insulator made of a non-conducive material may be provided in contact with the RFID tag. This will effectively protect the RFID tag from external impact or abrupt changes in the external temperature.

The separable members may be connected with each other using an opening/closing means so as to allow open/close operation. This will allow communication between the RFID tag in the container and an external read/write terminal or so even when the container, usually used in a opened manner, is closed.

In either one of the housing structures described in the above, the antenna coil may be formed in a cylindrical shape or concentric disk shape. This will be advantageous in completing the housing structure of an RFID tag of the present invention by using the RFID tag widely marketed.

The installation structure for an RFID tag of the present invention is such that installing on an installation plane of a conductive member any one of the housing structure described in the above.

Such installation structure will facilitate management of such conductive member using the RFID tag.

In particular, an RFID tag having a cylindrical antenna coil and so as to have a rod shape as a whole is highly reducible in size, which will facilitate the installation of such tag even when only a limited area on the conductive member is affordable for the installation.

According to such constitution, communication between the RFID tag and an external read/write terminal will be ensured even when the RFID tag is housed in a container made of a conductive material such as a metal having a large mechanical strength.

The installation structure of an RFID tag as set forth in claim 9 is such that installing an RFID tag having an antenna coil and a control section on a conductive member, in which the RFID tag is installed on an installation plane of a conductive member, and covered on the surface thereof with a protective member made of a conductive material, and a flux leakage path is provided between the conductive member and the protective member, or in at least either thereof.

According to such constitution, a part of magnetic flux goes out from the RFID tag distributes over the installation plane thereof and leaks outward through the flux leakage path; such leakage magnetic flux can mediate communication typically with an external read/write terminal.

On the other hand, magnetic flux emitted from the read/write terminal comes through the flux leakage path, and a part of the flux is detected by the antenna coil of the RFID tag.

Thus the communication is enabled even when the RFID tag is installed to the conductive member and protected by the protective member typically made of a metal with an excellent mechanical strength.

The protective member may be formed in a plate or cap. The protective member in a plate form can protect the RFID tag on the lateral plane thereof opposite to the installation plane of the conductive member, whereas the protective member in a cap form can protect the entire surface of such RFID tag.

It is also allowable to form an installation groove to the conductive member, and to install the RFID tag on the bottom plane, or the installation plane, of such installation groove.

Such constitution also allows a part of magnetic flux goes out from the RFID tag, or a part of magnetic flux directed to such RFID tag to distribute in a space within the installation groove, which can mediate communication through the flux leakage path.

Such constitution allows the protective member to be installed so as not to project out from the installation groove.

The protective member may be composed of a block material having in the surface portion thereof a housing portion, and may be set, while housing the RFID tag in such housing portion, in the installation groove so as to oppose such housing portion to the installation plane of the conductive member.

Such housing of the RFID tag in the housing portion of the protective member and installation of such protective member into the installation groove allows precise positioning of such RFID tag.

The RFID tag may have a cylindrical antenna coil so as to have a rod shape as a whole, and may be installed so as to align the axial direction thereof in parallel to the installation plane of the conductive member, and so as to approximately come into contact with such installation plane.

Such constitution also allows a part of magnetic flux goes out from the RFID tag, or a part of magnetic flux directed to such RFID tag to distribute in a space within the installation groove, which can mediate communication through the flux leakage path.

The RFID tag having a cylindrical antenna coil to thereby have a rod shape as a whole is highly reducible in size, so that the tag can be installed on the conductive member which is only affordable of a small installation area.

The RFID tag having a cylindrical antenna coil and thus having a rod shape as a whole may be installed so as to align the axial direction thereof obliquely to the installation plane of the conductive member.

This allows a part of the magnetic flux to distribute in an upper space over the bottom plane, or the installation plane, of the installation groove formed in the conductive member, and thus allows communication using such magnetic flux through the flux leakage path. This is also advantageous in further reducing a projected area of the installation plane.

The RFID tag having a concentric disc-shaped antenna coil may be installed so as to align the antenna coil plane thereof in parallel to the installation plane of the conductive member, and a flux leakage path may be formed between the installation member and the protective member, or in at least either thereof.

Such constitution allows a part of the magnetic flux to distribute in the upper space over the installation plane or the installation groove even when the RFID tag has a concentric disk-shaped antenna coil, and thus allows communication using such magnetic flux through the flux leakage path.

In either one of the installation structures described in the above, the protective member may be fixed to the conductive member with a fixing means. This will allow stable fixation of the protective member to the conductive member.

The protective member may be fixed to the conductive member with the fixing means while being interposed with a spacer made of a non-conductive material. This will facilitate formation of the flux leakage path in an arbitrary dimension.

Further in either one of the installation structures described in the above, a shock absorber or a heat insulator made of a non-conducive material may be provided in contact with the RFID tag. This will effectively protect the RFID tag from external impact or abrupt changes in the external temperature.

A communication method using an RFID tag according to the present invention is such that using an RFID tag, having an antenna coil and a control section, as being surrounded by a conductive member, in which the conductive member is provided with a flux leakage path, and communication is effected between the RFID tag and an external device provided outside the conductive member as being mediated by a magnetic flux leaks through such flux leakage path.

Such communication method allows the RFID tag to communicate with an external device provided outside the conductive member using the leakage magnetic flux through the flux leakage path provided to a conductive member, even if the RFID tag is surrounded by such conductive member.

It is also allowable to install the RFID tag to an installation member made of a conductive material, and cover on the surface side thereof with a protective member made of a conductive material, to thereby make such RFID tag surrounded by a conductive member comprising said installation member and the protective member, which allows the communication using magnetic flux leaks through the flux leakage path provided between the installation member and the protective member, or in at least either thereof.

The installation member may have an installation groove formed therein, and the RFID tag may be installed in such installation groove.

Even if the RFID tag is housed in a container made of a conductive material and such RFID tag is thus surrounded by such conductive container, the communication can be mediated by the leakage magnetic flux leaks through the flux leakage path provided to such container.

The container may be composed of a plurality of separable members, and the flux leakage path may be provided to the separation planes thereof or in at least one of such separable members.

The container may be composed of a housing portion having an opening and a lid portion capable of closing such opening.

The separable members may be connected with each other using an opening/closing means so as to allow open/close operation.

A communication method using an RFID tag according to the present invention is such that using an RFID tag having an antenna coil and a control section and respectively installed to each of a plurality of planar conductive members stacked with each other, in which a flux leakage path is formed between each adjacent conductive members, and communication is effected between the RFID tag and an external device provided outside the conductive member as being mediated by a magnetic flux leaks through such flux leakage path.

Such communication method allows the RFID tag to communicate with the external, even when the RFID tag is installed to each of a plurality of planar conductive members stacked with each other, by using the leakage magnetic flux thorough the flux leakage path formed between each adjacent conductive members.

The antenna coil is preferably formed into a cylindrical shape or concentric disk shape. In particular, the RFID tag having a cylindrical antenna coil and accordingly having a rod shape as a whole is highly size-reducible, and can readily be installed even to a conductive member only affordable of a small installation area.

The communication can also be effected by the RFID tag having an concentric disk antenna coil, if the antenna coil is installed so as to direct the antenna coil plane thereof in parallel to the installation plane of the conductive member, in which the leakage magnetic flux leaks through the flux leakage path can mediate the communication between the RFID tag and the external of the conductive member.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF THE PREFERRED EMBODIMENTS

Figure 1:
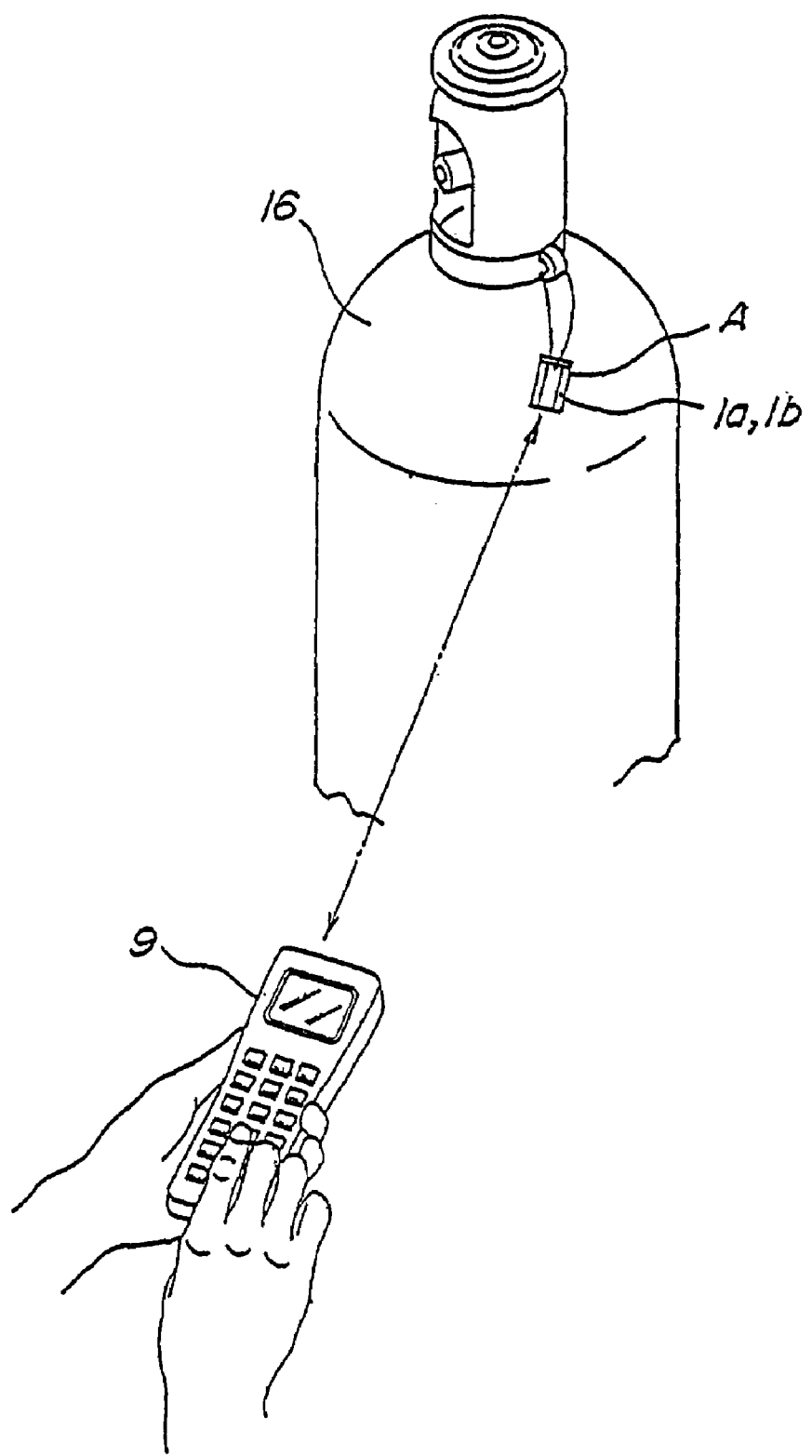
FIG. 1 is a schematic view explaining a mode of use of an RFID tag housed in a container made of a conductive material and attached to a gas bomb as a conductive member according to the housing structure of an RFID tag of the present invention.

Embodiments of the housing structure, installation structure and communication method of the RFID tag of the present invention will specifically be explained referring to the attached drawings. FIGS. 1 to 11B are the drawings for explaining the housing structures, installation structures and communication methods of an RFID tag having a cylindrical antenna coil and housed in a container made of a conductive material; and FIGS. 12 to 16B are the drawings for explaining those for an RFID tag having a concentric disk shaped antenna coil housed in a similar manner.

First, referring to FIGS. 1 to 11B, housing structures, installation structures and communication methods of an RFID tag having a cylindrical antenna coil and being housed in a container made of a conductive material will be explained.

It should now be noted that the RFID tags 1a and 1b, preferably applicable to the embodiments described below, relate both to those of electromagnetic coupling type and electromagnetic induction type although the description below specifically deals with the latter type.

An RFID tag 1a shown in FIGS. 1 to 11B has a cylindrical antenna coil 2a and a semiconductor IC chip 4 as a control section, both of which being directly connected with each other without interfaced by a printed circuit board or the like, which successfully results in size reduction of the RFID tag 1a.

The single-wire-wound, cylindrical antenna coil 2a has a cylindrical core member 3 made of iron, ferrite or so inserted therein along the axial direction thereof (the lateral direction in FIG. 4), in which such antenna coil 2a, core member 3, semiconductor IC chip 4 and so forth are formed in an integrated manner to provide a rod shape as a whole.

Figure 5:
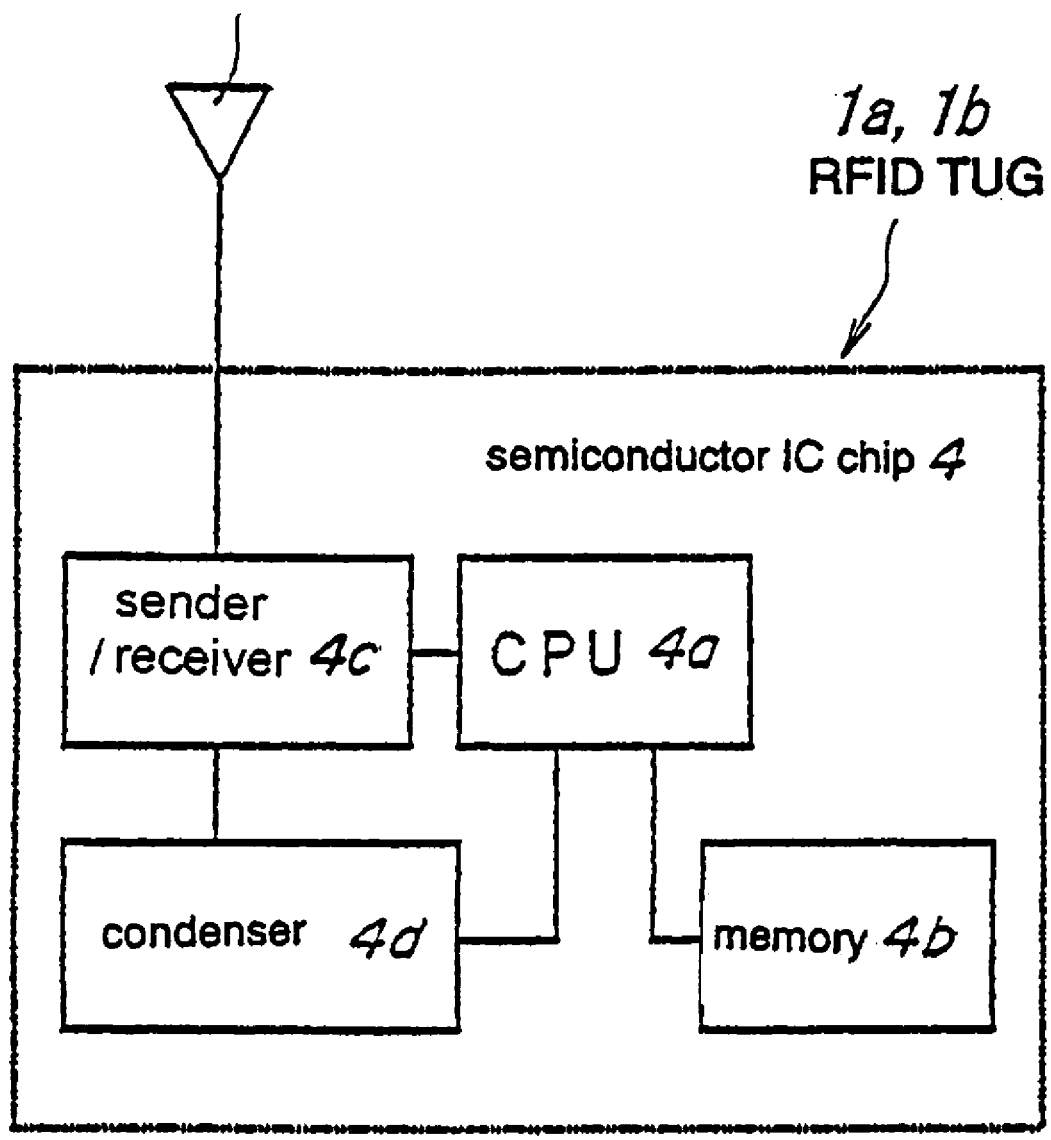
FIG. 5 is a block diagram showing a constitution of a control section of the RFID tag.

The semiconductor IC chip 4 comprises an IC (integrated circuit) chip or an LSI (large-scale integrated circuit) chip packaged in an integrated manner, and such semiconductor IC chip 4 has incorporated therein a CPU (central processing unit) 4a as a control section, a memory 4b as a memory section, a sender/receiver 4c and a capacitor 4d as a power storage means, as shown in FIG. 5.

A signal sent from an external read/write terminal 9, shown in FIG. 1, is received by the sender/receiver 4c, transmitted to the CPU 4a and converted into electric power to be stored in the capacitor 4d. It is now also allowable to omit the capacitor 4d as a power storage means, and instead continuously supply electric power from the external read/write terminal 9 to the semiconductor IC chip 4.

The CPU 4a is responsible for reading out programs or various data stored in the memory 4b, performing necessary operations and decision, to thereby enable various controls.

The memory 4b contains various programs for allowing operation of the CPU 4a, and various information such as history data and lot management data of products or parts having a conductive member to which an RFID tag 1a or 1b is attached as being housed in a container "A" made of a conductive material detailed later.

The RFID tags 1a, 1b employed in this embodiment are based on the single-wavelength amplitude shift keying (ASK), has a wide resonance frequency range, have antenna coils 2a, 2b respectively having a wire diameter as small as several tens micrometers with or without a core member 3, and individually have a CMOS-IC of extremely small electric power consumption having a specific send/receive circuit incorporated therein.

Employing such ASK radio communication system can successfully avoid frequency shifting as being affected by the conductive member and thus can exempt from drop in received power or disturbance in communication signals unlike the FSK system, and instead a stable communication will be ensured by virtue of leakage magnetic flux leaks through a flux leakage path 12.

From an aspect of sensitivity (communication distance), the frequency used for the ASK radio communication system should preferably range from 50 kHz to 500 kHz, and more preferably, range from 100 kHz to 400 kHz. In this embodiment of the present invention, an ASK radio communication of 125 kHz is used.

Experimental results obtained by the present inventors revealed that the magnetic field H can propagate by diffraction even out from a narrow gap, and that the RFID tags 1a and 1b can send or receive the magnetic field, which is a medium for power supply or information communication, to or from an external read/write terminal 9 only if a fine physical gap is provided.

There are some materials possibly generate eddy current responding to the magnetic field H generated during communication or electric power transmission using such RFID tag 1a or 1b, which will result in generation of a counter magnetic flux which attenuates the initial magnetic flux; examples of such conductive materials most typically include stainless steel sheet, copper sheet and aluminum sheet, and also include ferromagnetic metals such as iron, cobalt, nickel, alloys thereof and ferrite; paramagnetic metals such as aluminum, copper and chrome; and conductive plastics.

The lower the electric resistance of the conductive material is, the larger the eddy current generated from the change of magnetic field H is to become. Accordingly, from an aspect of sensitivity (communication distance), using an iron type alloyed conductive member, such as an iron with a relatively high electric resistance or a stainless steel, would be advantageous for this invention.

Figure 4:
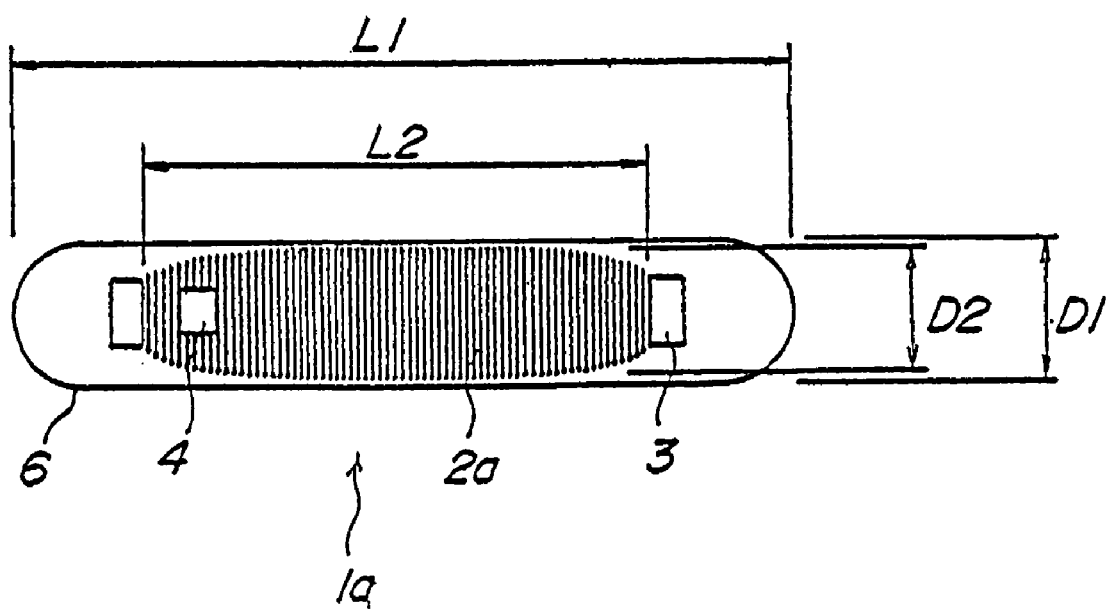
FIG. 4 is a front view showing an exemplary constitution of the RFID tag having a cylindrical antenna coil.

As shown in FIG. 4, the RFID tag 1a having an outer diameter $D_2$ in the radial direction is encapsulated in a glass container 6 as a non-conductive material having an outer diameter $D_1$ corresponding to $D_2$.

The glass container 6 employed in this embodiment has a length $L_1$ in the axial direction of approx. 7 to 15.7 mm, and an outer diameter $D_1$ of approx. 2.12 to 4.12 mm. An opening 7 of a housing portion 5, or a separable member made of a conductive material, is thus formed in a size enough for accommodating the RFID tag 1a having the length $L_1$ and the outer diameter $D_1$. The weight of the RFID tag 1a is approx. 55 to 400 mg.

Typical values for the length $L_1$ in the axial direction and the outer diameter $D_1$ of the RFID tag 1a; and a length $L_2$ in the axial direction and the outer diameter $D_2$ of the antenna coil 2a are listed in Table 1 below.

TABLE 1

| | | Type 1 | Type 2 | Type 3 |
|---|---|---|---|---|
| Glass container 6 | Length $L_1$ in the axial direction | 12.00 mm | 13.18 mm | 15.90 mm |
| | Outer diameter $D_1$ | 2.12 mm | 3.10 mm | 4.06 mm |
| Antenna coil 2a | Length $L_2$ in the axial direction | 6.02 mm | 6.44 mm | 5.78 mm |
| | Outer diameter $D_2$ | 1.45 mm | 1.64 mm | 1.63 mm |

In a typical antenna coil 2a, a single copper wire having a diameter of approx. 30 μm is wound in a stacked form in the radial direction and in a cylindrical form in the axial direction; where an inductance of such antenna coil 2a having the core member 3 inserted therein was approx. 9.5 mH (at 125 kHz), and an electrostatic capacity of a capacitor connected for resonation to the antenna coil 2a was approx. 170 pF (at 125 kHz).

In FIG. 1, a reference numeral 16 denotes a gas bomb containing oxygen gas, acetylene gas or the like, as an example of a commodity to be managed. The gas bomb 16 is attached with a metal container "A" in which an electromagnetic induction tag 1a or 1b is enclosed.

The electromagnetic induction tag 1a or 1b stores an ID code number unique to the individual gas bombs 16, which is read by a read/write terminal 9 to allow product management of such gas bomb 16.

Figure 2:
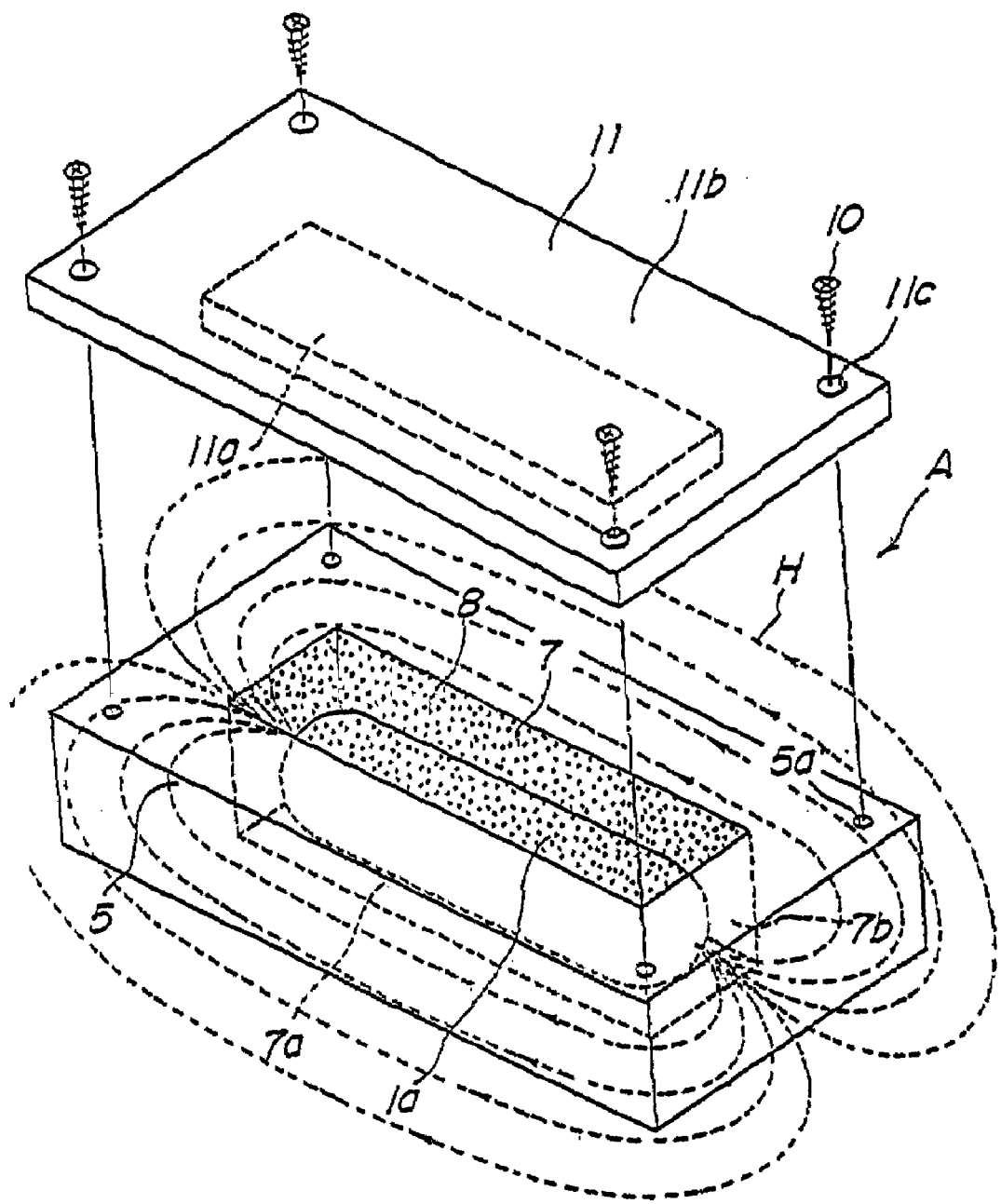
FIG. 2 is an exploded perspective view showing an RFID tag housed in an opening of a square-sectioned housing portion made of a conductive material and covered with a lid plate having a projected portion to be engaged with the opening.
Figure 3:
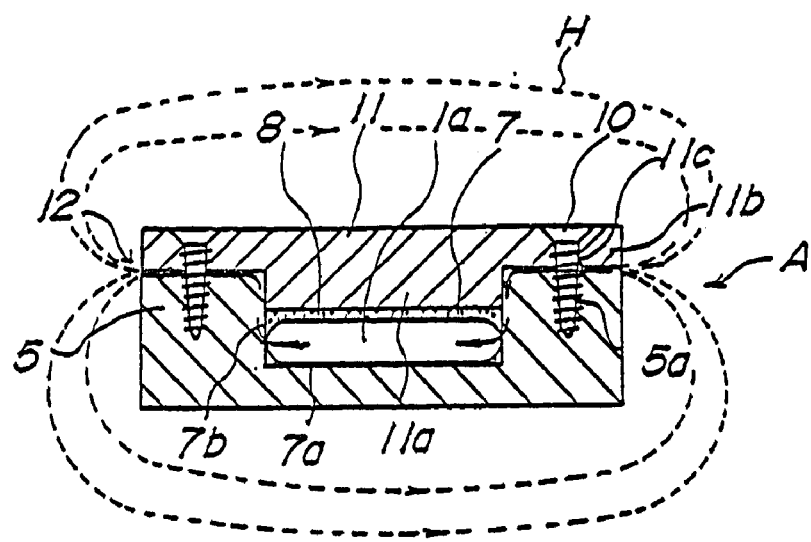
FIGS. 3A to 3C are schematic sectional views showing different modes of fixation of the lid plate to the housing portion using various fixing means.
Figure 3:
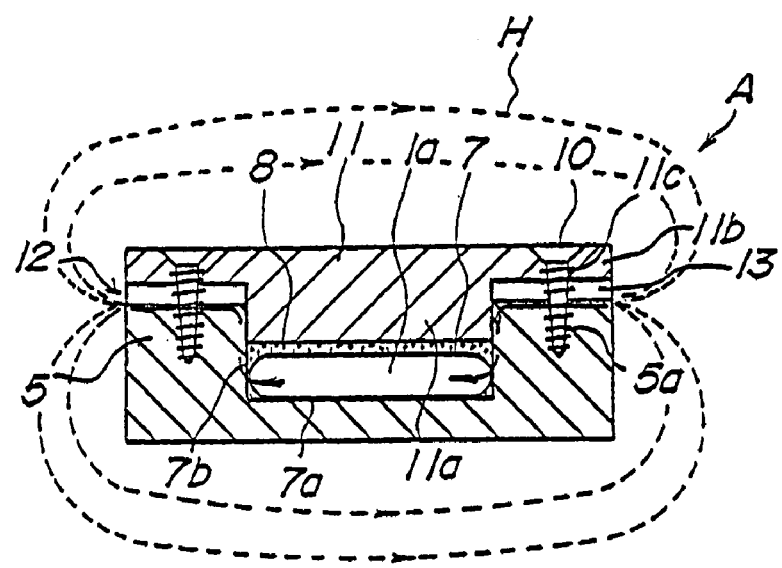
Figure 3:
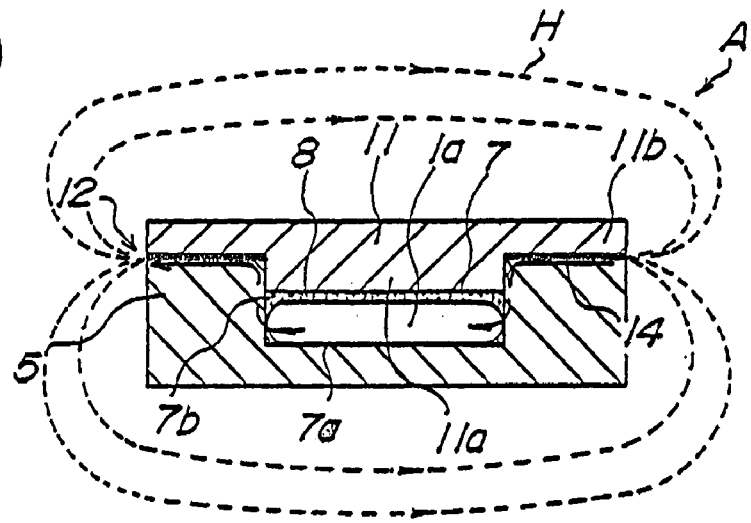

The metal container "A" shown in FIG. 2 made of a conductive material comprises two separable members of a square-sectioned housing portion 5 and a lid plate 11 for covering the opening 7 of the housing portion 5. The RFID tag 1a is housed in the opening 7 of the housing portion 5, the residual space in the opening 7 is filled typically with a resin 8 as a non-conductive material, the housing portion 5 and the lid plate 11 are joined with each other and fixed using machine screws 10 as fixing means, to thereby cover and protect the RFID tag 1a.

It is now also allowable that the metal container "A" is composed of an additional number of separable members which are joined with each other to enclose therein the RFID tag 1a.

The RFID tag 1a is placed in the opening 7 of the housing portion 5, and directly placed on the bottom plane 7a thereof, or the installation plane, of the opening 7, so as to align the axial direction thereof (lateral direction in FIGS. 3A to 3C) in parallel to such bottom plane 7a and so as to approximately come into contact therewith without interposed with a spacer or the like.

The residual space in the opening 7 around the glass container 6 encapsulating the RFID tag 1a is filled with a non-conductive protective member such as the resin 8 or an adhesive. It is also allowable to provide a non-conductive shock absorber or a heat insulator such as sponge or glass wool in contact with the RFID tag 1a housed therein, and to further cover the surface thereof with the resin 8 or the like.

On the top surface side of the RFID tag 1a housed in the opening 7, the square sectioned lid plate 11 made of a conductive material such as a metal is provided so as to cover the top surface side of such RFID tag 1a, and such lid plate 11 is fixed to the housing portion 5 using machine screws 10 as fixing means.

A concept of such constitution resides in that surrounding the RFID tag 1a in the container "A" comprising the housing portion 5 and the lid plate 11, forming the flux leakage path 12 between the joining planes or separable planes of such housing portion 5 and such lid plate 11, and enabling communication using leakage magnetic flux available through such flux leakage path 12.

The RFID tag 1a is formed in a rod shape as a whole and the opening 7 is formed to have a square section corresponding to the dimension of such RFID tag 1a. The lid plate 11 has in the central portion thereof an engagement portion 11a having a shape corresponding to that of the opening 7 and is provided so as to be projected toward the opening 7. The lid plate 11 can properly be positioned by fitting the engagement portion 11a to the opening 7, and can be fixed to the housing portion 5 using machine screws 10 by inserting them into through-holes 11c drilled in a flanged portion 11b of such lid plate 11 and by tightening them into tapped holes 5a formed in the housing portion 5.

It is now also allowable to fix the lid plate 11 to the housing portion 5 by using tapped machine screws without providing the tapped holes 5a.

The RFID tag 1a may be molded typically with a resin instead of being encapsulated in the glass container 6, and is further embedded into the non-conductive resin 8 or an adhesive.

Figure 6:
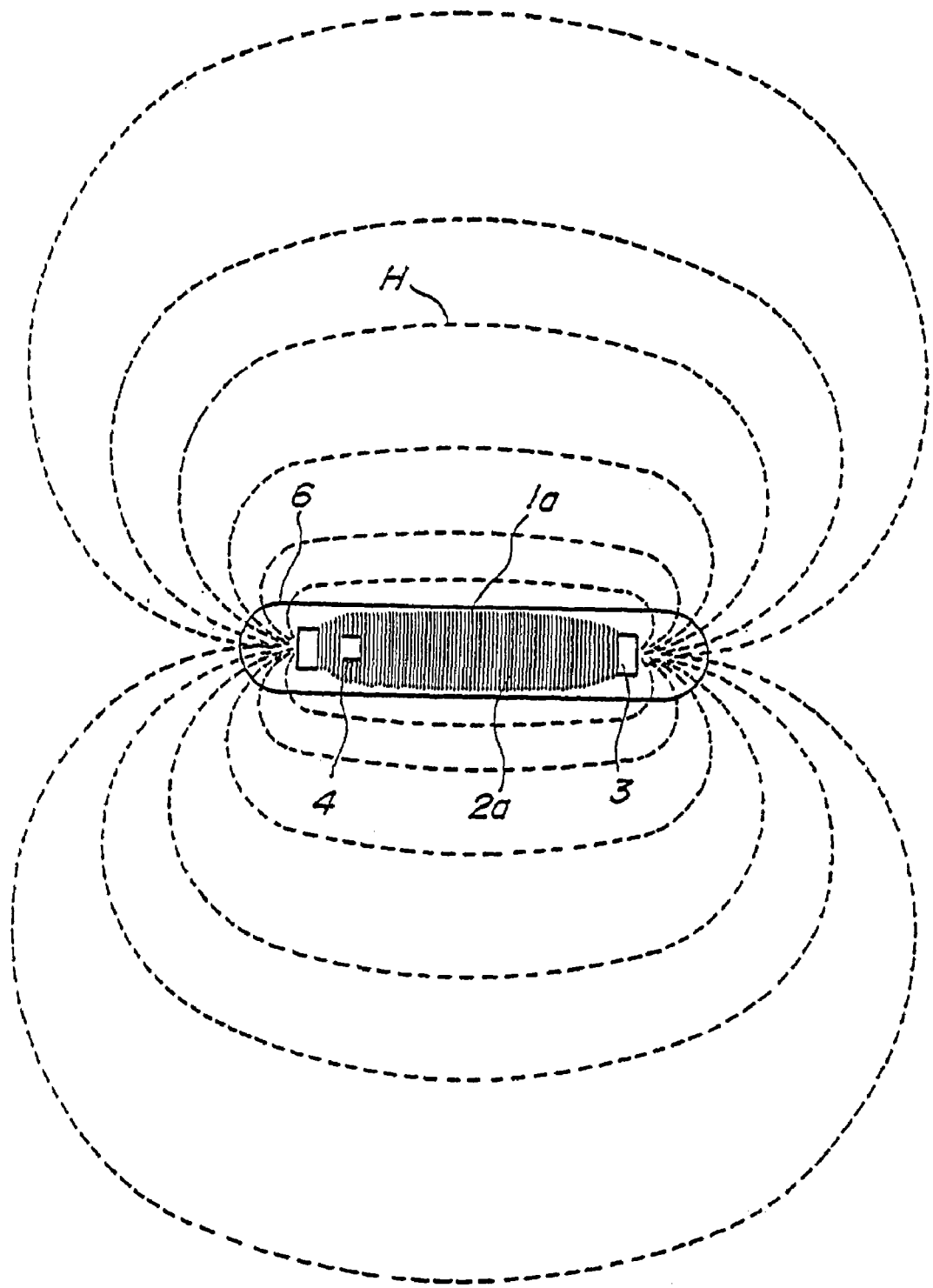
FIG. 6 is a schematic view showing a magnetic field formed around the RFID tag having a cylindrical antenna coil.
Figure 7:
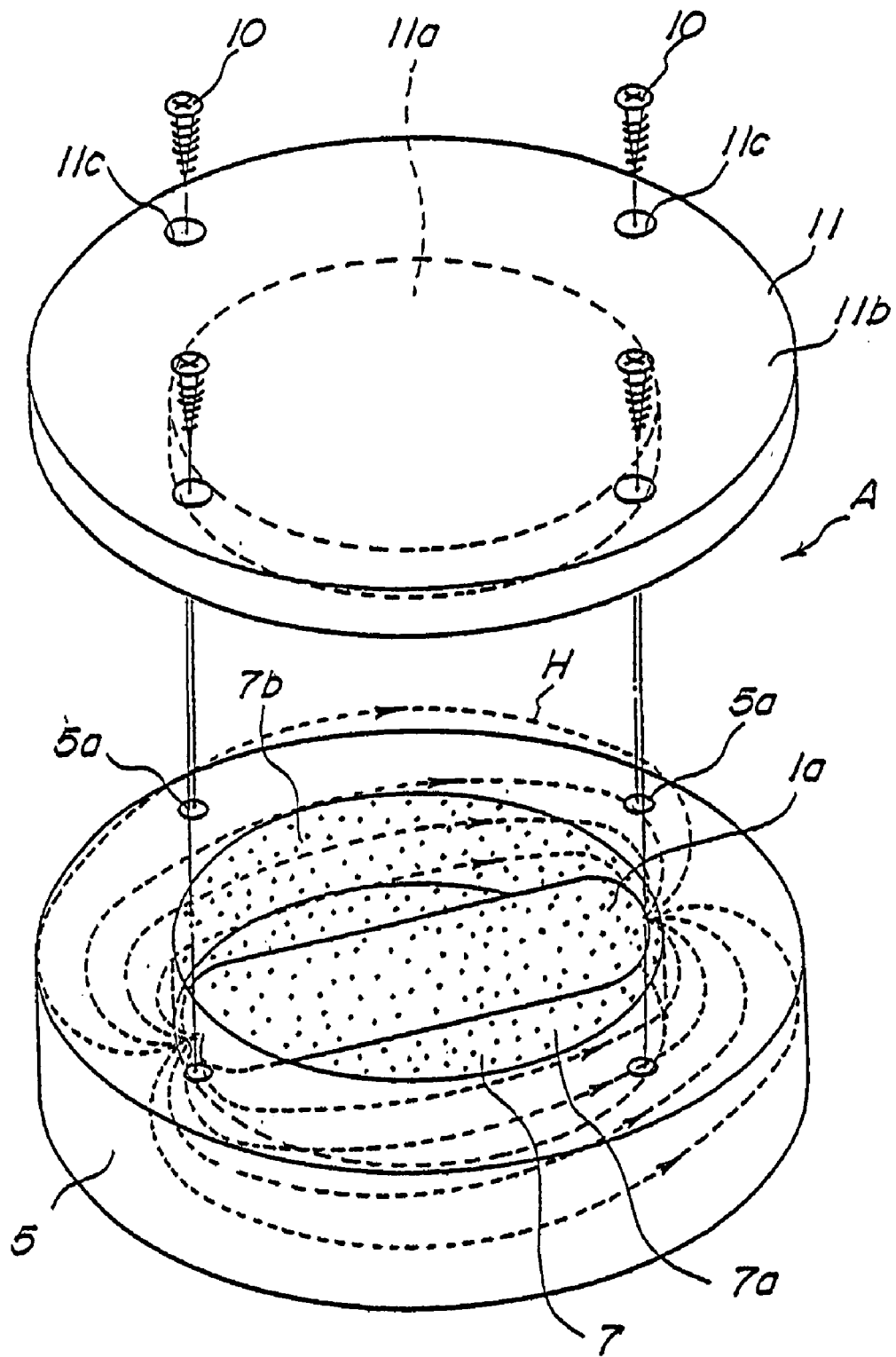
FIG. 7 is an exploded perspective view showing an RFID tag housed in an opening of a round-sectioned housing portion made of a conductive material and covered with a lid plate having a projected portion to be engaged with the opening.

FIG. 6 shows a profile of magnetic field H formed around the RFID tag 1a kept in a free state.

The end portion of the antenna coil 2a of the RFID tag 1a and the end portion in the axial direction of the glass container 6 are located in a positional relation defined by a dimensional difference between $L_1$ and $L_2$ listed in Table 1 above, and a resultant predetermined gap, formed between the lateral plane 7b of the opening 7 shown in FIGS. 2 and 3A to 3C, and the end portion in the axial direction of the antenna coil 2a facilitates the formation of the magnetic flux loop penetrating such antenna coil 2a, which contributes the formation of the magnetic field H.

As shown in FIG. 3A, the flux leakage path 12 which is responsible for leaking the magnetic flux is formed between the separation planes or contact planes of the housing portion 5 and lid plate 11 fixed with each other with machine screws 10.

The gap serves as the flux leakage path 12 will be controlled depending on a desired amount of the leakage flux, and will be adjusted by controlling the tightening force of the machine screws 10 or the degree of surface roughness of the contact planes. For the case the flux leakage path 12 is ensured between the roughened planes, the opposing planes come into contact locally at a number of distributed points, and the portion causing no contact can serve as such flux leakage path 12.

Processing either one of the contact planes so as to have a surface roughness of approx. 0.04 μm ensures a gap of approx. 0.08 μm between such contact planes, which allows a desired degree of leakage of the electromagnetic wave.

FIG. 3B shows an exemplary constitution in which the housing portion 5 and the lid plate 11 are fixed using the machine screws 10 while being interposed with a spacer 13 made of a non-conductive material such as rubber or resin, which ensures the flux leakage path 12 having a relatively large thickness.

Interposing the spacer 13 between the lid plate 11 and the housing portion 5 is preferable in terms of enhancing the leakage magnetic flux through such spacer 13 while ensuring the sealing property.

FIG. 3C shows an exemplary constitution in which the housing portion 5 and the lid plate 11 are fixed using an adhesive 14, which makes the separation planes or contact planes approximately flat, and ensures the flux leakage path 12 between such contact planes.

Fixing the lid plate 11 to the housing portion 5 using the adhesive 14 allows a simple fixation, and can enhance the leakage magnetic flux while ensuring the sealing property, since a physical flux leakage path 12 made of a non-conductive material is formed between the housing portion 5 and the lid plate 11.

It is now also allowable to interpose the spacer 13 between the lid plate 11 and the housing portion 5 and adhere the lid plate 11, the spacer 13 and the housing portion 5 together using the adhesive 14.

The present inventors found based on the experimental results that the magnetic field H can propagate by diffraction even out from a narrow gap, and confirmed that mutual send/receive operation of AC magnetic field, which is a medium for power transmission and information communication, is enabled between the RFID tag 1a and an external read/write terminal 9 if the flux leakage path 12 as a fine physical gap is formed so as to allow the magnetic flux to leak therethrough in an amount sufficient for the send/receive operation at a practical level.

The length and the gap width (average gap width) of the flux leakage path 12 may be of minimum values so far as the send/receive operation of the electromagnetic wave is ensured, where a gap width (average gap width) of approx. 0.08 μm (average) will be sufficient.

Composing the container "A" for housing and surrounding the RFID tag 1a with a plurality of separable members, more specifically the housing portion 5 and the lid plate 11, using a conductive material, and forming the flux leakage path 12 between the housing portion 5 and the lid plate 11 makes the container "A" stronger against external stress or impact, and allows the electromagnetic wave to leak through such flux leakage path 12, which enables the mutual send/receive operation of AC magnetic field, which is a medium for power transmission and information communication, between the RFID tag 1a and the external read/write terminal 9.

The magnetic field H can generate as shown in FIGS. 3A to 3C even when the RFID tag 1a is directly installed on the bottom plane 7a of the top-opened opening 7 of the housing portion 5 so as to approximately come into contact therewith and is further covered with the lid plate 11 made of a conductive material such as a metal, in which the leakage magnetic flux available through the flux leakage path 12 is responsible for the communication between the RFID tag 1a housed in the container "A" and the external read/write terminal 9 or the like.

While the opening 7 shown in FIG. 2 typically has a square section as corresponded to the lid plate 11, it is also allowable to use the round housing portion 5 and the disk-shaped lid plate 11, and to form the round-sectioned opening 7 to the housing portion 5 so as to house the RFID tag 1a.

The housing portion 5 may be designed in preliminary consideration of the shape of opening 7, or may be formed by drilling using a drill or so a plurality of holes aligned side by side so as to attain the square section as for the opening 7 shown in FIG. 2. Also the round-sectioned opening 7 shown in FIG. 7 can be formed with ease typically by drilling.

Since the direction of the magnetic flux generated by the antenna coil 2a coincides with the contact planes of the lid plate 11 and the housing portion 5 (lateral direction in FIGS. 3A to 3C), the magnetic flux can effectively propagate by diffraction, which contributes the formation of the magnetic field H outside the container "A".

According to such constitution, a part of the magnetic flux distributes over the bottom plane 7a, or the installation plane, of the housing portion 5, leaks out through the flux leakage path 12, and the leakage magnetic flux thus obtained is used for the communication with the read/write terminal 9 beyond the lid plate 11.

On the other hand, the magnetic flux emitted from a sender such as the read/write terminal 9 comes through the flux leakage path 12 into the opening 7 closed with the lid plate 11, and a part of such magnetic flux is then detected by the antenna coil 2a of the RFID tag 1a.

Hence the RFID tag 1a can communicate with the external even in a state being housed in the opening 7 of the housing portion 5 and being protected with the lid plate 11 made of a conductive material such as a metal having a large mechanical strength.

Forming the opening 7 to the housing portion 5, and installing the RFID tag 1a on the bottom plane 7a, or the installation plane, of such opening 7 allow a part of the magnetic flux generated from or directed to the RFID tag 1a to distribute in the space within the opening 7, which is responsible for the communication through the flux leakage path 12.

Housing the RFID tag 1a in the container "A" comprising the housing portion 5 and the lid plate 11 ensures safe retainment of such RFID tag 1a, which prevents such RFID tag 1a from being undesirably damaged even when impact due to external force is applied on the container "A".

Beside the fixation of the lid plate 11 to the housing portion 5 using the machine screws 10 or adhesive 14, it is also allowable to employ a shutter structure which allows open/close operation in a sliding manner, or a hinge mechanism which allows open/close operation in a swinging manner.

Figure 8:
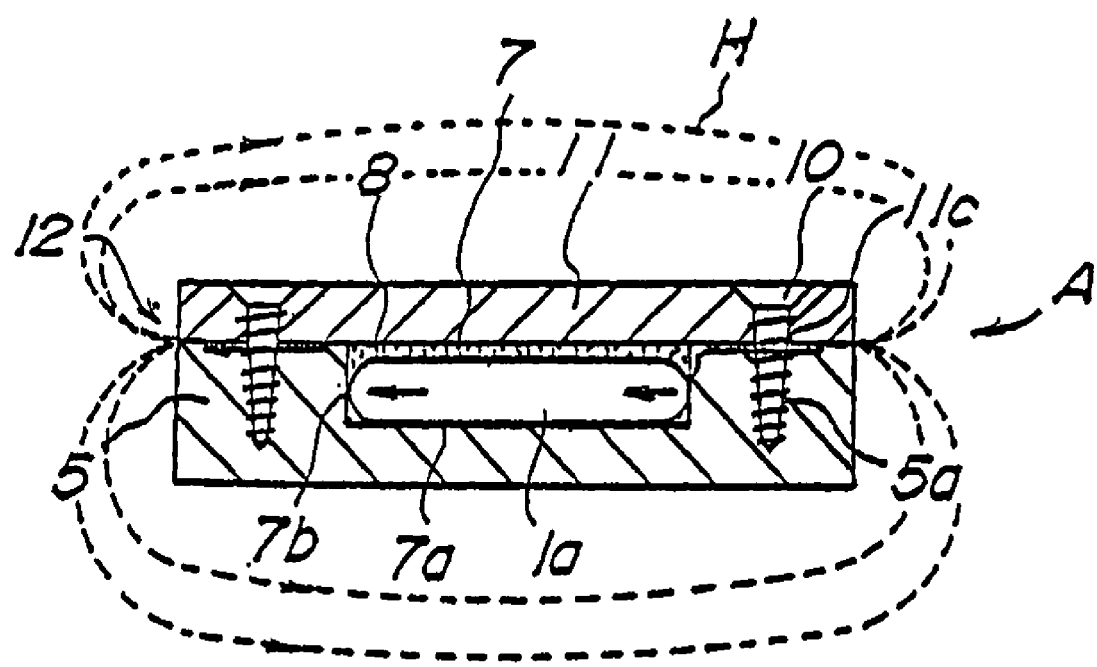
FIG. 8 is a schematic sectional view showing an RFID tag housed in an opening of a housing portion made of a conductive material and covered with a flat lid plate.

FIG. 8 shows an example in which the lid plate 11 comprises a flat plate having no engagement portion 11a unlike the foregoing embodiment, and such lid plate 11 comes into direct contact with the housing portion 5 and fixed thereto using the machine screws 10 as fixing means.

It is now also allowable, similarly to the foregoing embodiment, to interpose the spacer 13 made of a non-conductive material between the lid plate 11 and the housing portion 5, or to adhere the lid plate 11 to the housing portion 5 using the adhesive 14.

While not shown in the drawings, it is also allowable to provide at the center of the lid plate 11 a square box portion which corresponds with the opening 7 of the housing portion 5 but projects upward departing from such opening 7, to thereby form a housing space comprising the box portion and the opening 7 in which the RFID tag 1a can be housed.

Thus the RFID tag 1a can be housed in the housing space comprising the opening 7 of the housing portion 5 and the square box portion of the lid plate 11, and the lid plate 11 can be fixed to the housing portion 5 with bolts and nuts to thereby house and cover the RFID tag 1a.

It is allowable again in this case to interpose the spacer 13 made of a non-conductive material between the lid plate 11 and the housing portion 5, or adhere the lid plate 11 to the housing portion 5 using the adhesive 14.

Providing a shock absorbing material or a heat insulating material within the opening 7 of the housing portion 5 and in the box portion of the lid plate 11 to thereby protect the RFID tag 1a can ensure more effective retainment of the RFID tag 1a and temperature stabilization, which is advantageous in stabilizing the property of such RFID tag 1a.

Figure 9:
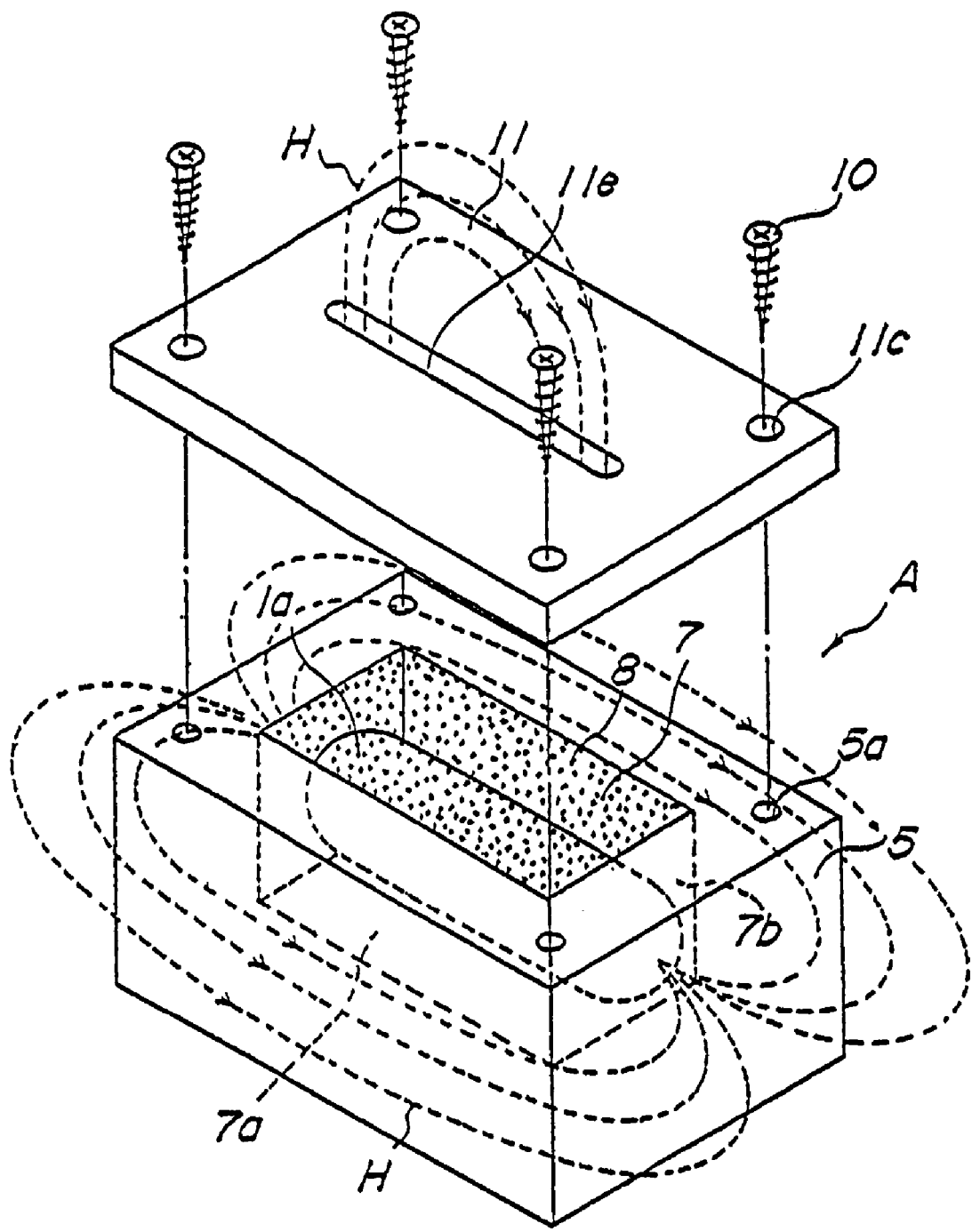
FIG. 9 is an exploded perspective view showing the lid plate having a straight slit.

FIG. 9 shows an example in which the flat lid plate 11 has a slit 11e which is provided as a through-hole having a length corresponding to the length $L_2$ of the antenna coil 2a along the axial direction of the RFID tag 1a having such antenna coil 2a. The slit 11e may be closed with an adhesive or filler made of a non-conductive material.

The magnetic field H can propagate while being diffracted at the edge of the slit 11e provided as the flux leakage path to the lid plate 11, and extends over the bottom plane 7a of the opening 7, or the installation plane, which allows the RFID tag 1a to improve efficiency in the send/receive operation of AC magnetic field, a medium for electric power transmission or information communication, with the external read/write terminal 9.

Beside the lid plate 11, the flux leakage path such as the slit can also be provided to other separable members, such as housing portion 5.

Figure 10:
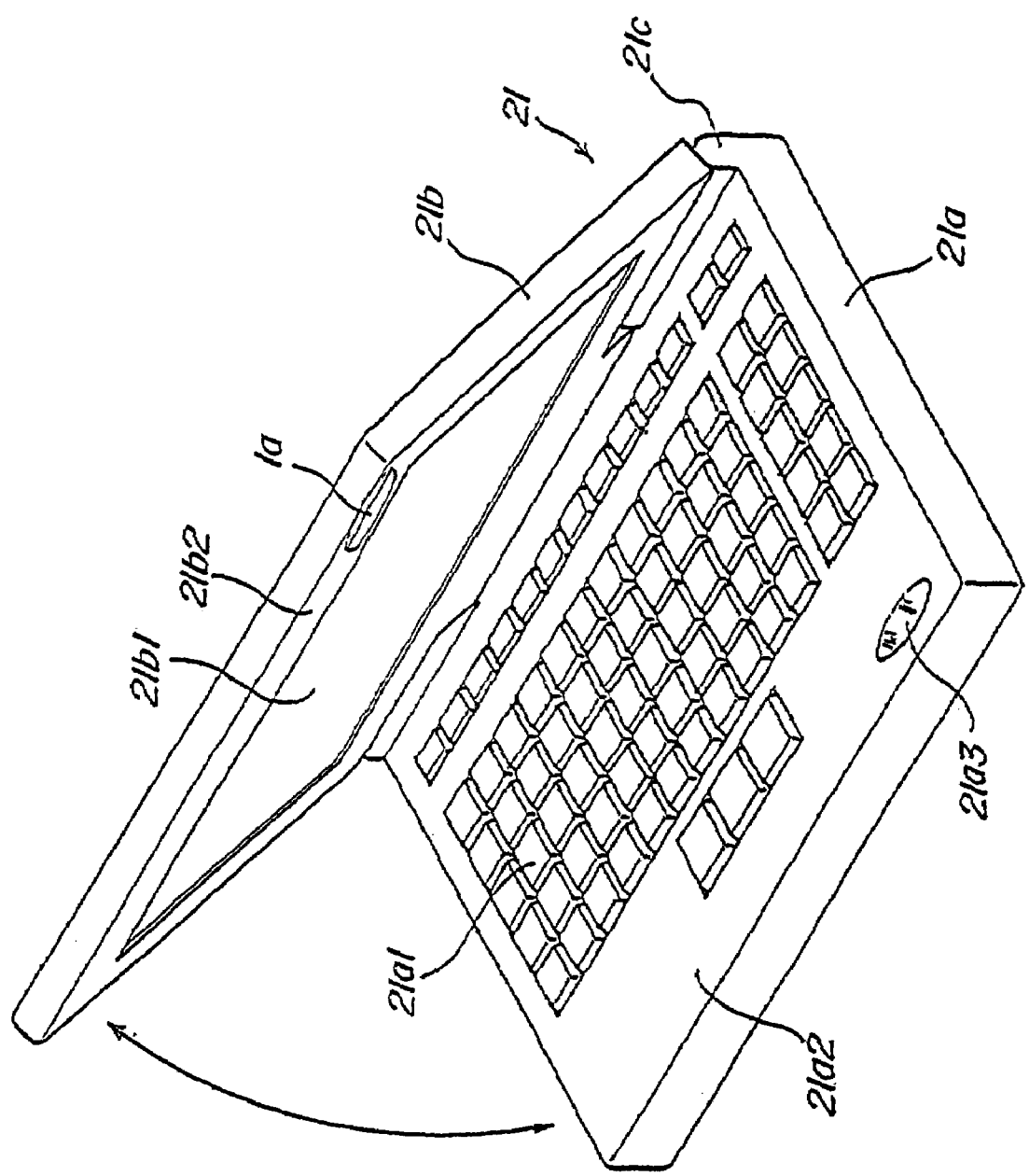
FIG. 10 is a perspective view showing an exemplary application of a housing structure, installation structure and communication method of an RFID tag of the present invention to a notebook-sized personal computer.
Figure 11:
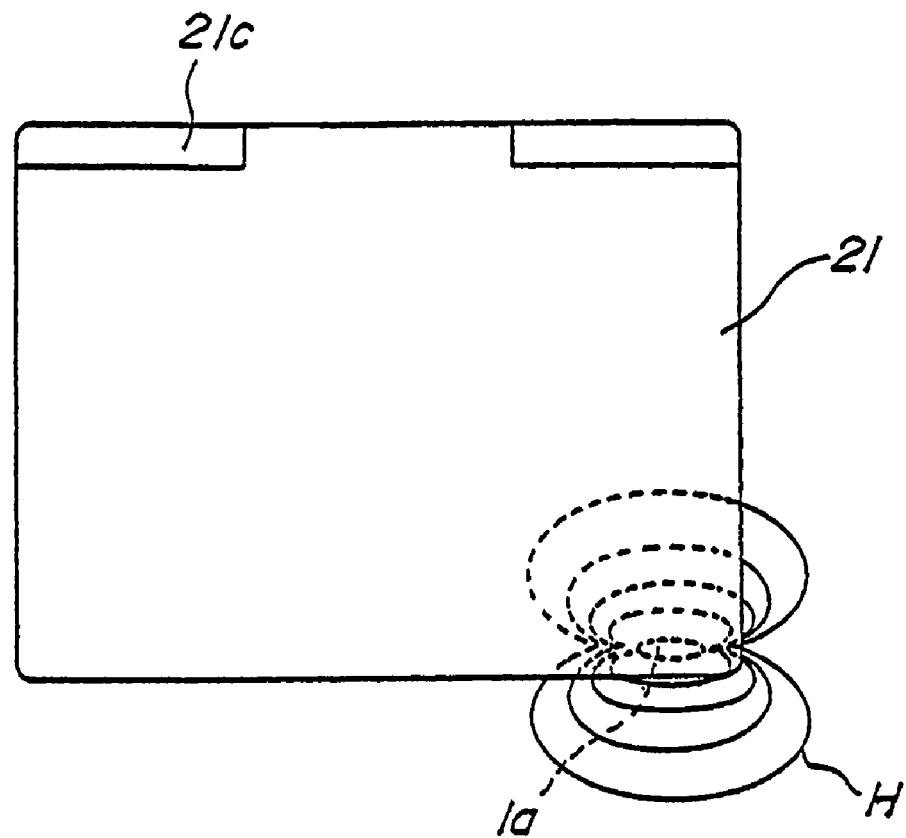
FIGS. 11A and 11B are a plan view and a side view, respectively, showing an exemplary application of a housing structure, installation structure and communication method of the RFID tag of the present invention to a notebook-sized personal computer.
Figure 11:
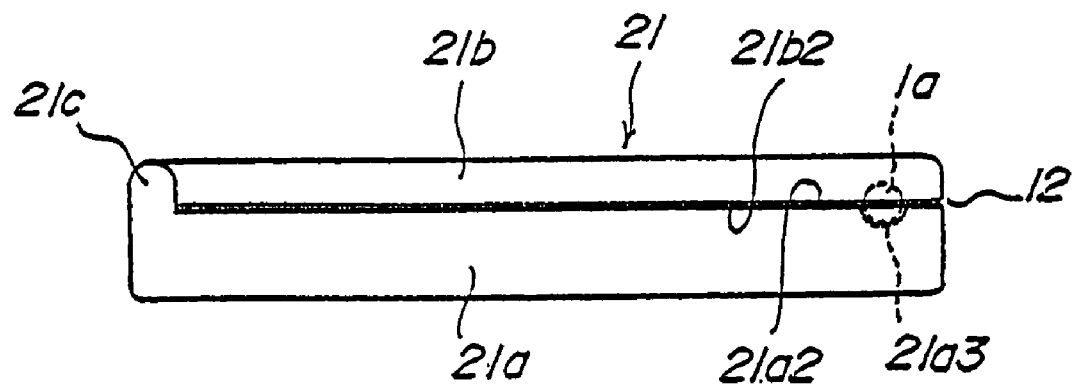

In FIGS. 10, 11A and 11B, reference numeral 21 denotes a notebook-sized personal computer as a container comprising a plurality of separable members made of a conductive material, that is, the exterior thereof is surrounded by a metal case as a conductive member.

The notebook-sized personal computer 21 comprises a main body portion 21a equipped with a keyboard $21a_1$, and a lid portion 21b equipped with a liquid crystal display $21b_1$, where both portions 21a and 21b are connected so as to swing around a hinge member 21c as a rotating axis to thereby swing-open or close the lid portion 21b.

While the notebook-sized personal computer 21 is a typical commodity such that having the lid portion 21b and the main body portion 21a opposed with each other and that being composed so as to open or close the lid portion 21b relative to the main body portion 21a as illustrated in FIG. 11B, the present invention is also applicable to product management of personal digital assistant, mobile phone and other commodities based on the similar constitution.

The RFID tag 1a is placed so as to face to a gap which can be formed between a plane $21b_2$ of the lid portion 21b and a plane $21a_2$ of the main body portion 21a. The memory 4b of the RFID tag 1a stores history data or lot management data of the notebook-sized personal computer 21 to which the RFID tag 1a is attached.

It is also allowable for the RFID tag 1a to store only a specific code information of the notebook-sized personal computer 21, where such code information is read out by a read/write terminal 9 to be used as a key for searching into a separate data base for the history data or lot management data.

In this embodiment, the lid portion 21b has on the plane $21b_2$ thereof the RFID tag 1a fixed thereon with the aid of an adhesive or tacking material, and the main body portion 21a has on the plane $21a_2$ thereof a pit portion $21a_3$ at a site and in a size corresponded to those of the RFID tag 1a.

Information stored in the RFID tag 1a can be fetched typically by the read/write terminal 9 mediated by the magnetic field H formed with leakage magnetic flux coming out from the flux leakage path 12 which comprises a fine gap between the plane $21b_2$ of the lid portion 21b and the plane $21a_2$ of the main body portion 21a, as shown in FIG. 11A.

The flux leakage path 12 comprising a fine gap between the plane $21b_2$ of the lid portion 21b and the plane $21a_2$ of the main body portion 21a is formed so as to open at both ends along the axial direction of the antenna coil 2a of the RFID tag 1a, which facilitates the formation of magnetic flux penetrating the antenna coil 2a, to thereby helps the formation of the magnetic field H.

The magnetic field H can propagate out through the flux leakage path 12 comprising a fine gap formed between the plane $21b_2$ of the lid portion 21b and the plane $21a_2$ of the main body portion 21a, and the resultant leakage magnetic flux allows mutual send/receive of an AC magnetic field, a medium for electric power transmission and information communication, between the RFID tag 1a and an external read/write terminal 9, and fetching of information stored in such RFID tag 1a. Thus product management of a notebook-sized personal computer, personal digital assistant, mobile phone and any other types of electronic appliances or commodities which have a metal enclosure and can be swing-opened to provide a double spread structure will be effected, by placing the RFID tag 1a so as to face to a gap which can be formed between the one member and the other member composing such metal enclosure, and by fetching information stored in such RFID tag 1a.

It is therefore made possible to fetch information stored in the RFID tag 1a from outside of the packages, without unpackaging, even when re-inspection of already packaged products is required, which improves the workability.

Next, referring to FIGS. 12 to 16B, housing structures, installation structures and communication methods of an RFID tag having a concentric disk-shaped antenna coil 2b and being housed in a container made of a conductive material will be explained. It should now be noted that constitutions similar to those explained in the above for the RFID tag 1a having the cylindrical antenna coil 2a will be assigned with the same reference numerals, while omitting the explanations thereof.

The RFID tag 1b shown in FIGS. 12 to 16B has a concentric disk-shaped antenna coil 2b and a semiconductor IC chip 4 as a control section, both of which being directly connected with each other without interfaced by a printed circuit board or the like, which successfully results in size reduction of the RFID tag 1b. The constitution of the control section of the RFID tag 1b is similar to that described in the above referring to FIG. 5.

Figure 14:
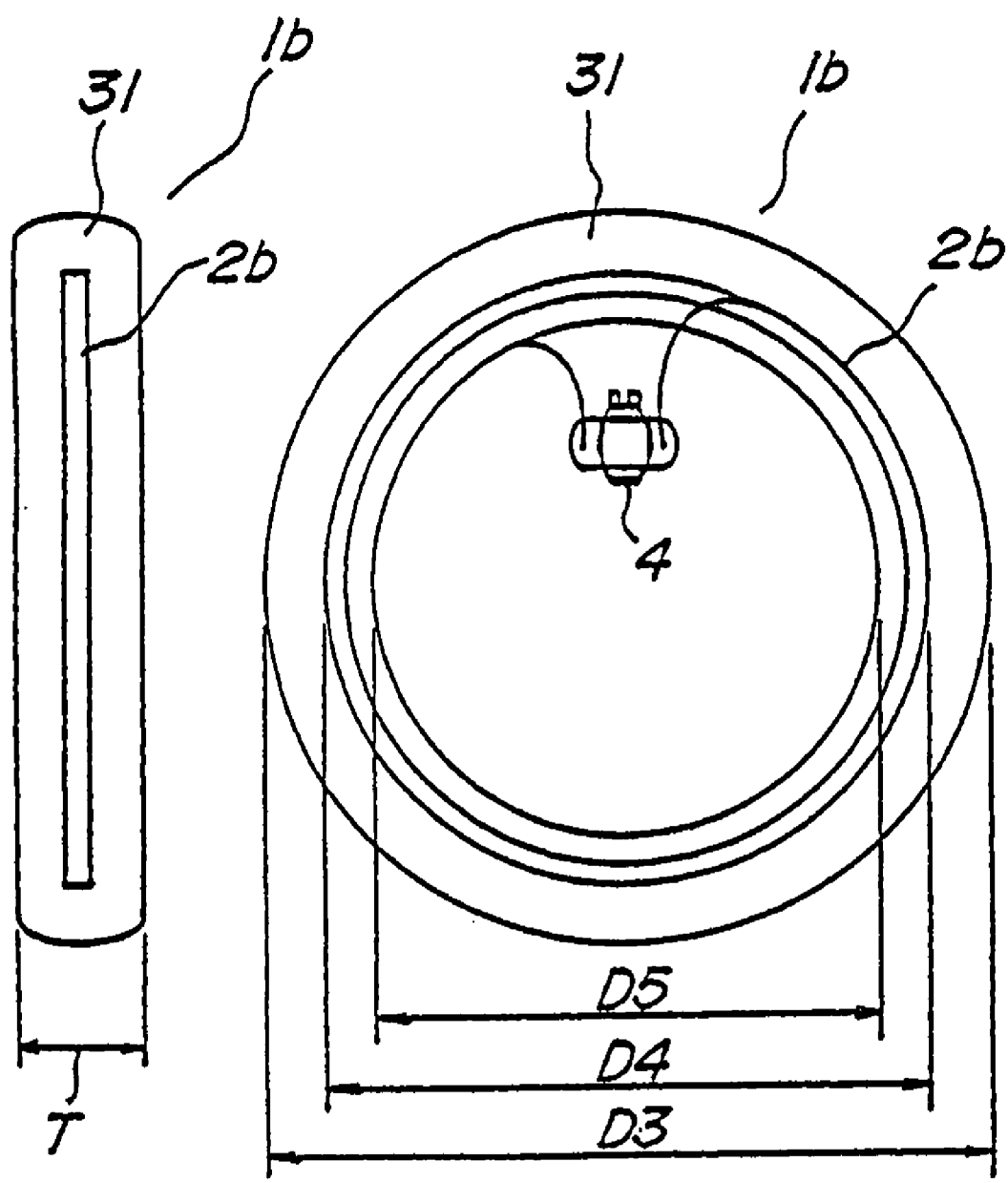
FIG. 14 is a side view and a front view, respectively, showing the RFID tag having the concentric disk shaped antenna coil.

The RFID tag 1b shown in FIG. 14 has inside thereof the concentric disk-shaped antenna coil 2b having a single-wire-wound and radially stacked structure and the semiconductor IC chip 4 or the like, all of which are molded in a resin package 31 in an integrated manner, to thereby give a disk appearance as a whole.

The RFID tag 1b is molded in the resin package 31 having an outer diameter $D_3$ capable of accommodating an outer diameter $D_4$ of the antenna coil 2b.

Typical values for the outer diameter $D_3$ of the resin package 31, the outer diameter $D_4$ of the antenna coil 2b, and the inner diameter $D_5$ of the antenna coil 2b are listed in Table 2 below.

TABLE 2

|  | Type 1 | Type 2 | Type 3 |
| --- | --- | --- | --- |
| Outer diameter $D_3$ of resin package 31 | 20 mm | 30 mm | 50 mm |
| Outer diameter $D_4$ of antenna coil 2b | 13.8 mm~ 15.2 mm | 22.1 mm~ 25.0 mm | 44.1 mm~ 46.0 mm |
| Inner diameter $D_5$ of antenna coil 2b | 10.5 mm~ 10.9 mm | 18.7 mm~ 20.3 mm | 42.0 mm~ 43.0 mm |

The thickness of the resin package 31 molding the RFID tag 1a is approx. 0.7 to 12.0 mm, and the weight thereof is approx. 0.7 to 5.2 g.

In a typical antenna coil 2b, a single copper wire having a diameter of approx. 30 μm is wound in a stacked form in the radial direction; where an inductance of such antenna coil 2b was approx. 9.5 mH (at 125 kHz), and an electrostatic capacity of a capacitor connected for resonation to the antenna coil 2b was approx. 170 pF (at 125 kHz).

Figure 15:
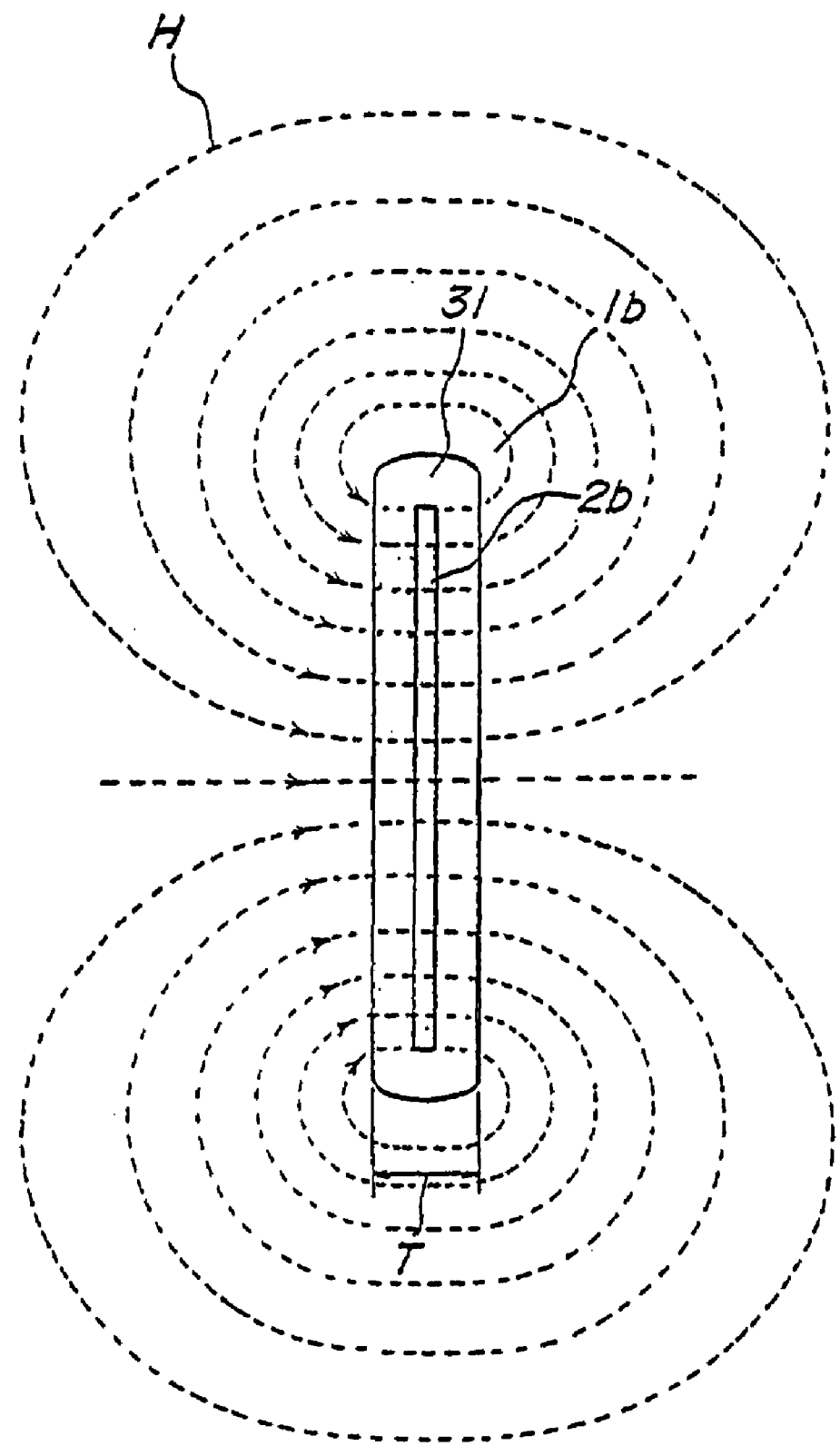
FIG. 15 is a schematic view showing a magnetic field around the RFID tag having the concentric disk shaped antenna coil.

FIG. 15 shows a profile of the magnetic field H generated around the RFID tag 1b held in a free state.

The housing portion 5 has formed therein a round-sectioned opening 7 corresponded in size with the RFID tag 1b, and the RFID tag 1b is installed therein so as to align the antenna coil plane thereof in parallel to the bottom plane 7a, or the installation plane, of the housing portion 5, where the flux leakage path 12 is formed between such housing portion 5 and the lid plate 11 typically made of a metal.

Figure 12:
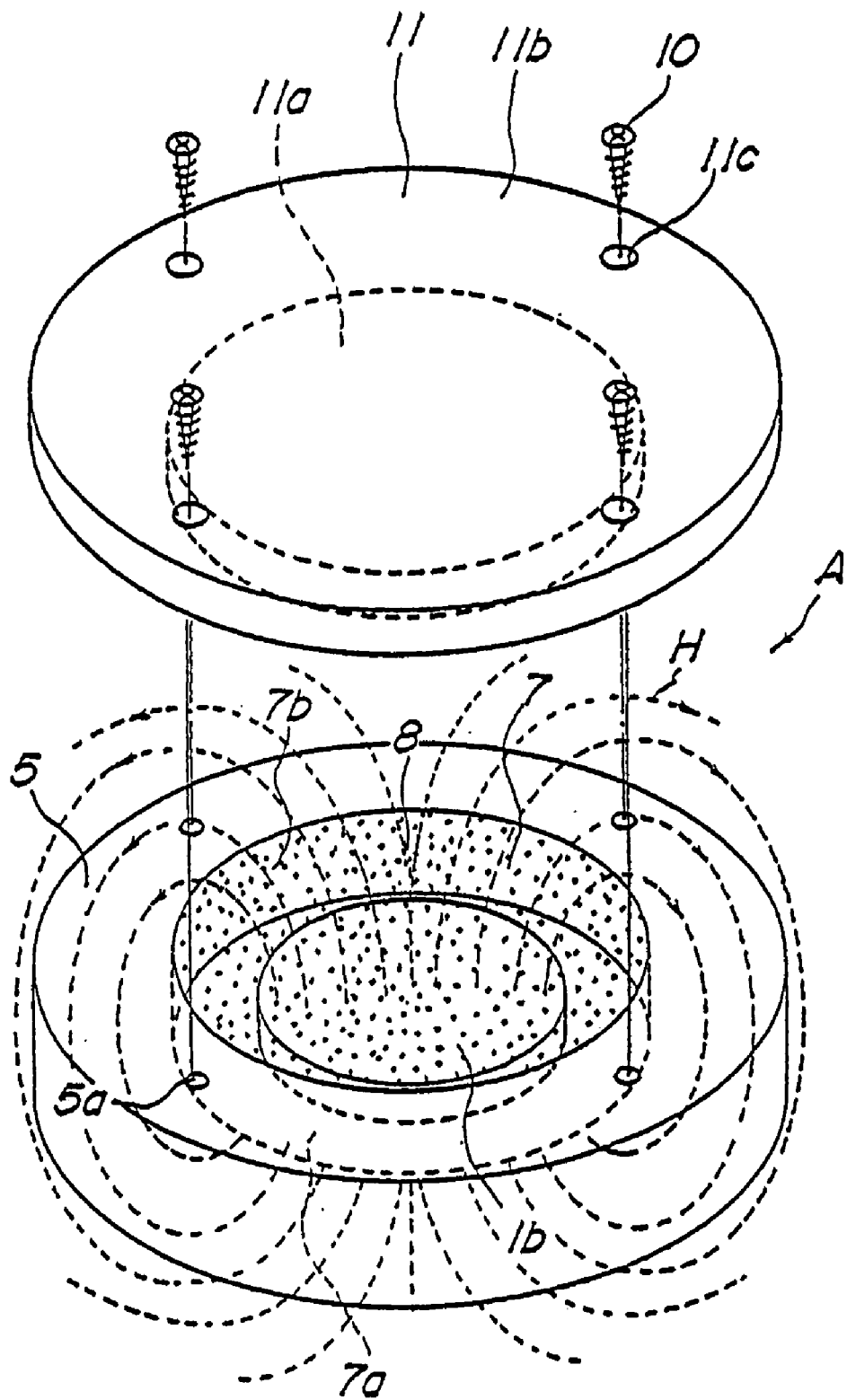
FIG. 12 is an exploded perspective view showing an RFID tag having a concentric disk shaped antenna coil housed in an opening of a round-sectioned housing portion made of a conductive material and covered with a lid plate having a projected portion to be engaged with the opening.
Figure 13:
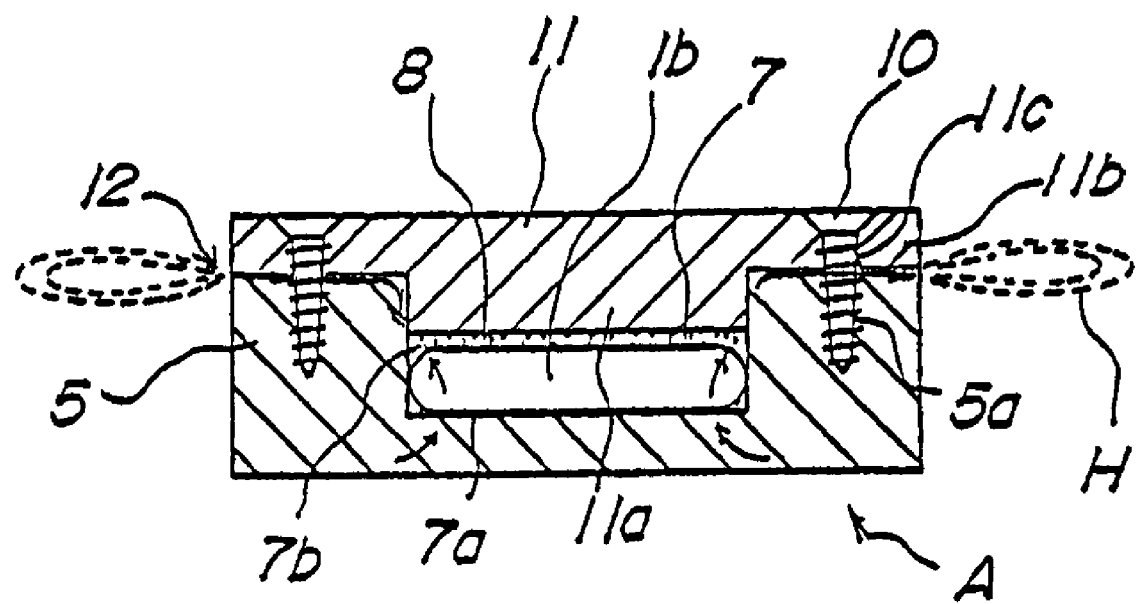
FIG. 13 is a schematic sectional view showing the lid plate shown in FIG. 12 fixed to the housing portion using fixing means.

The lid plate 11 shown in FIGS. 12 and 13 has in the central portion thereof an engagement portion 11a having a cylindrical shape corresponding to that of the opening 7 and is provided so as to be projected toward such opening 7. The lid plate 11 can properly be positioned by fitting the engagement portion ha to the opening 7, and can be fixed to the housing portion 5 using machine screws 10 by inserting them into through-holes 11c drilled in a flanged portion 11b of such metal member 11 and by tightening them into tapped holes 5a formed in the housing portion 5. It is now also allowable to fix the metal member 11 to the housing portion 5 by using tapped machine screws without providing the tapped holes 5a.

Now the RFID tag 1b may be encapsulated in a glass container instead of being molded in the resin package 31. It is also allowable to embed the RFID tag 1b into a flexible synthetic resin so as to make use of such resin also as a shock absorber.

FIG. 13 shows the RFID tag 1b housed in opening 7 of the housing portion 5 together with a profile of the magnetic field H generated from such tag.

Although not shown in the drawings, the lid plate 11 may be composed of a flat plate, or may have a box portion for housing the tag. It is also allowable to interpose the spacer 13 between the housing portion 5 and the lid plate 11, or to use the adhesive 14 for the fixation. The fixation can also be accomplished by bolts and nuts.

Protecting the RFID tag 1b by filling the opening 7 of the housing portion 5 or the housing space in the lid plate 11 with a shock absorber or heat insulator will effectively ensure safe retainment of such RFID tag 1b and stabilize performances of the RFID tag 1b through stabilizing the temperature.

Figure 16A:
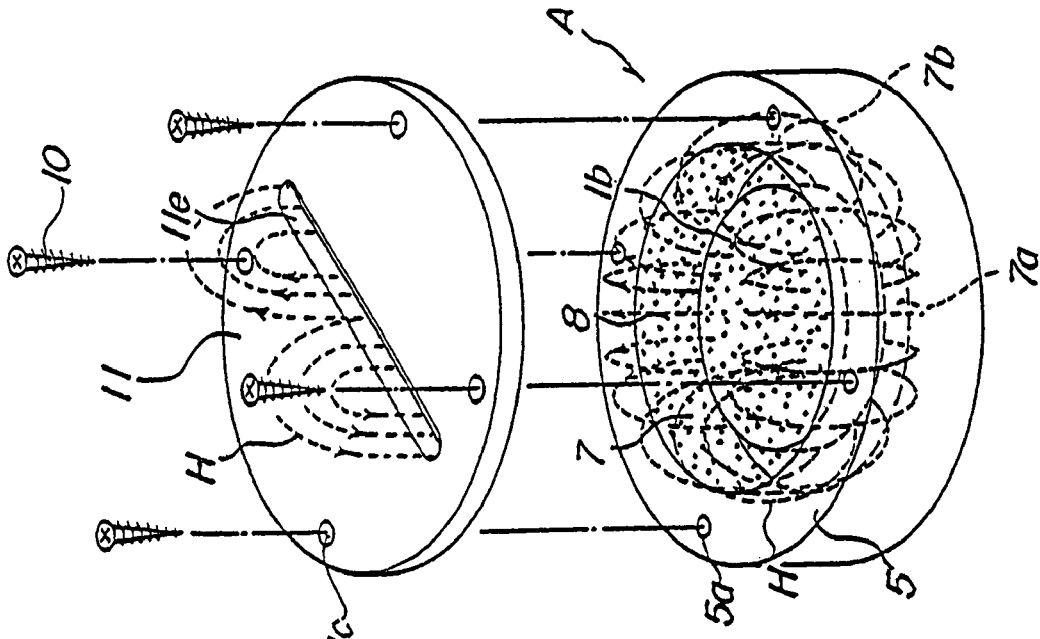
FIGS. 16A and 16B are exploded perspective views showing the lid plates respectively having different slits.

FIG. 16A shows an example in which the disk-shaped lid plate 11 has slits 11e which are provided as the flux leakage path 12 individually having a length corresponding to the outer diameter $D_4$ of the concentric disk-shaped antenna coil 2b along the radial direction of the RFID tag 1b having such antenna coil 2b, and crossed at the position corresponding to the center of the antenna coil 2b. The slits 11e may also be closed with an adhesive or filler made of a non-conductive material.

Figure 16B:
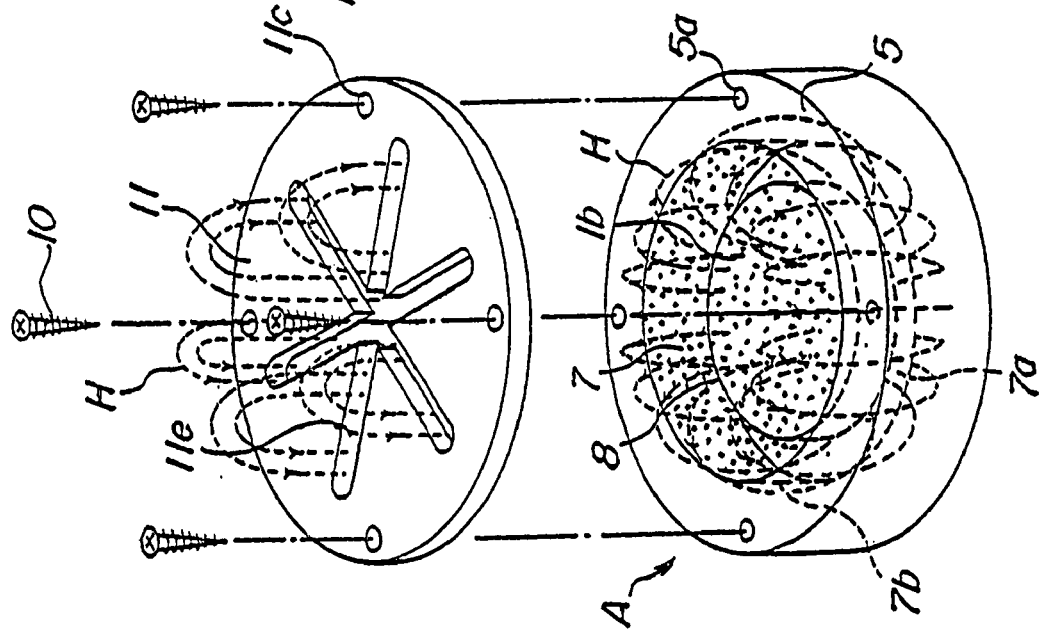

FIG. 16B shows an example in which the metal member 11 has a single slit 11e as the flux leakage path 12 along the radial direction of the antenna coil 2b. The slit 11e may also be closed with an adhesive or filler made of a non-conductive material.

The magnetic flux generated from the RFID tag 1b having the concentric disk-shaped antenna coil 2b can propagate through the slit(s) 11e provided as the flux leakage path, and diffracts thereat to form the magnetic field H over the bottom plane 7a, or the installation plane, of the housing portion 5, which allows the RFID tag 1b to send or receive AC magnetic field, a medium for electric power transmission or information communication, to or from the external read/write terminal 9.

Beside screw driving or adhesion, the fixation of the lid plate 11 to the housing portion 5 can also be accomplished by engagement, caulking, screw engagement, seam joining or tacking so as to allow the magnetic flux to leak out from the flux leakage path in an amount sufficient for ensuring practical send/receive operation. Seam joining can be effected by joining metal plates with a high density polyethylene layer or the like and rolling up the joint portion en bloc.

Figure 27:
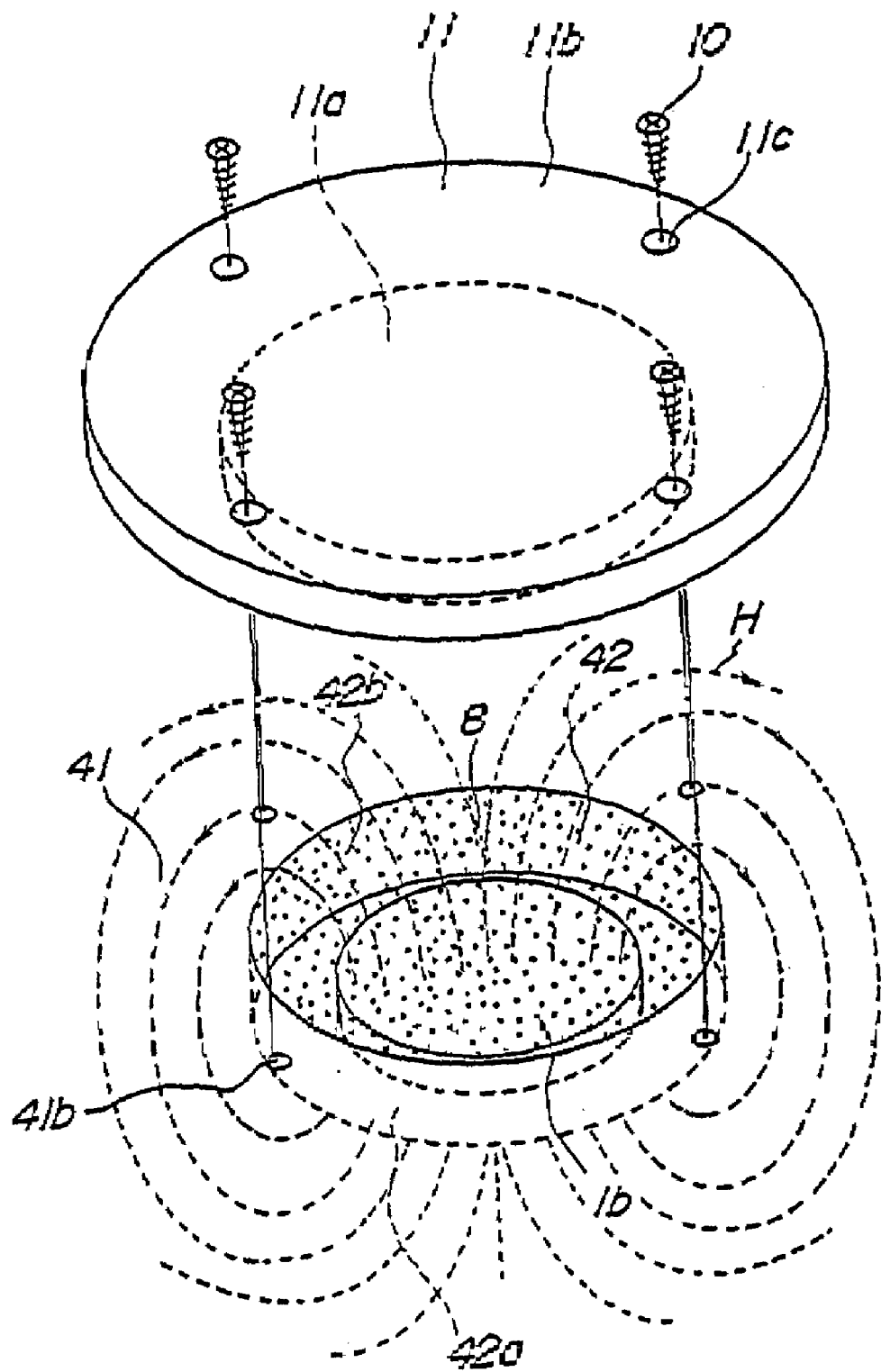
FIG. 27 is an exploded perspective view showing an exemplary attachment in which an RFID tag having a concentric disk shaped antenna coil is housed in an installation groove and is covered with a planar protective member having a projected portion to be engaged with the installation groove.
Figure 28:
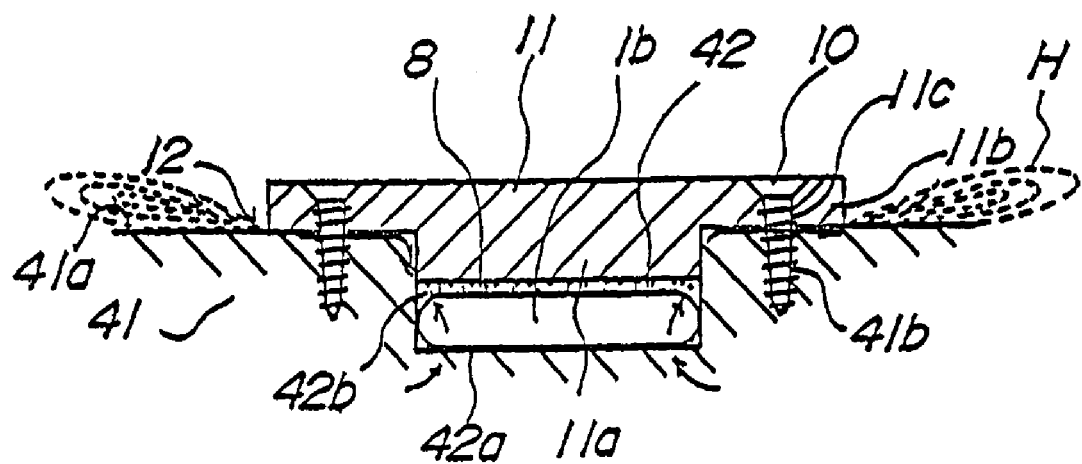
FIG. 28 is a schematic sectional view showing the planar protective member shown in FIG. 27 fixed to the conductive member using a fixing means.
Figure 29:
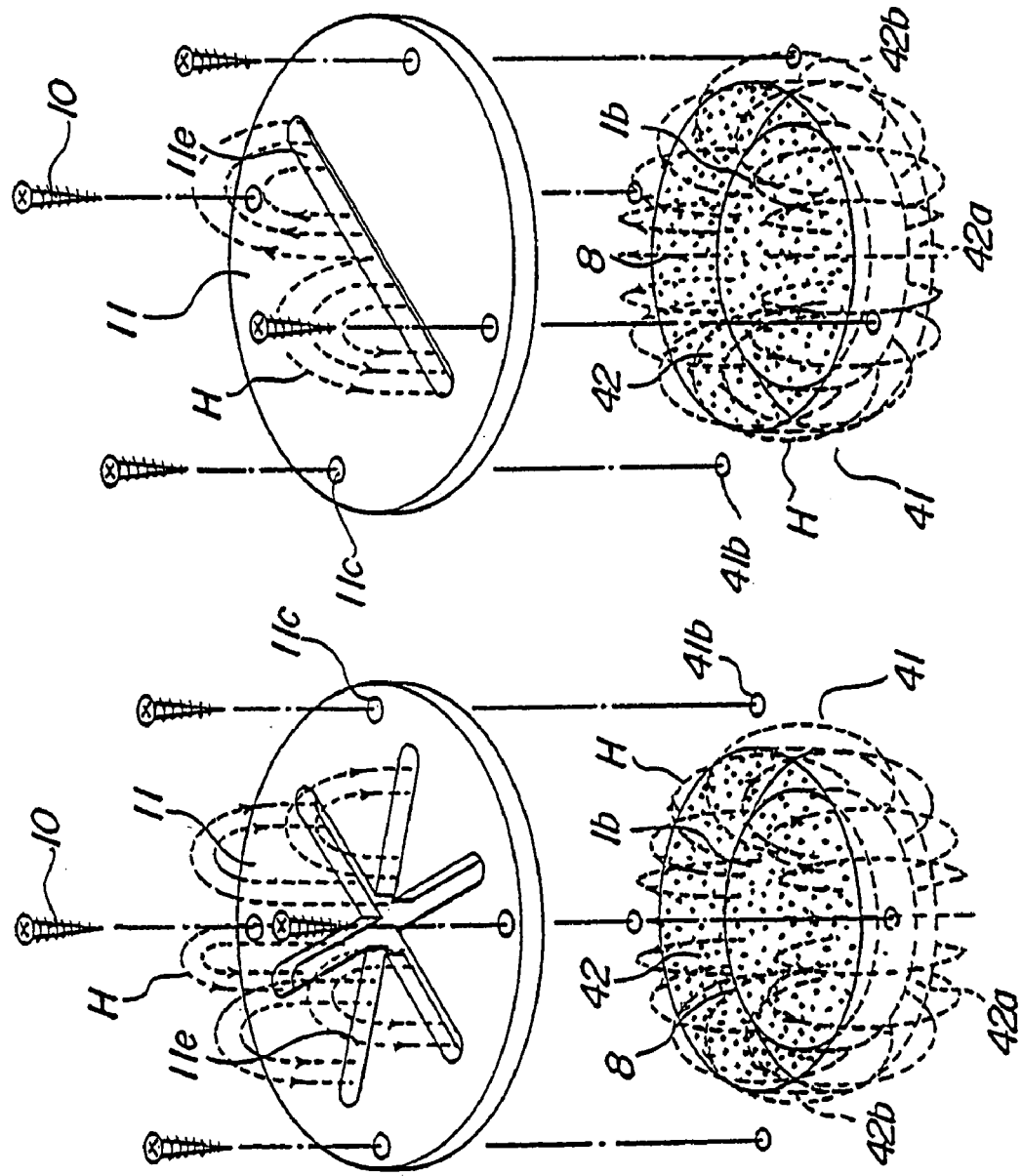
FIGS. 29A and 29B are exploded perspective views showing the planar protective members respectively having different slits.

Next, embodiments of the installation structure in which the RFID tag 1a or 1b is installed to the conductive member and communication method using such tag will be described. FIGS. 17 to 26 are drawings for explaining the installation structure and communication method using the RFID tag having the cylindrical antenna coil and is installed to the conductive member; and FIGS. 27 to 29 are drawings for explaining the installation structure and communication method using the RFID tag having the concentric disk-shaped antenna coil and is installed to the conductive member.

First, the installation structure and communication method using the RFID tag having the cylindrical antenna coil and is installed to the conductive member will be explained. It should now be noted that constitutions similar to those explained in the foregoing embodiments will be assigned with the same reference numerals, while omitting the explanations thereof.

As shown in FIG. 17 and FIGS. 18A to 18C, the conductive member 41 has on the surface 41a side thereof a top-opened installation groove 42 having a square section, in which the RFID tag 1a is directly placed on the bottom plane 42a, or the installation plane, of the installation groove 42, so as to align the axial direction thereof (lateral direction in FIGS. 18A to 18C) in parallel to such bottom plane 42a and so as to approximately come into contact therewith without being interposed with a spacer or the like.

The residual space in the installation groove 42 around the glass container 6 encapsulating the RFID tag 1a is filled with the protective member made of a non-conductive material such as the resin 8 or an adhesive to thereby ensure the fixation. It is also allowable to provide a non-conductive shock absorber or a heat insulator such as sponge or glass wool in contact with the RFID tag 1a.

On the top surface side of the RFID tag 1a housed in the installation groove 42, the lid plate 11 as a protective member typically made of a metal or other conductive material is provided to thereby cover such RFID tag 1a, and the lid plate 11 is fixed to the conductive member 41 using machine screws 10 as the fixing means.

Figure 17:
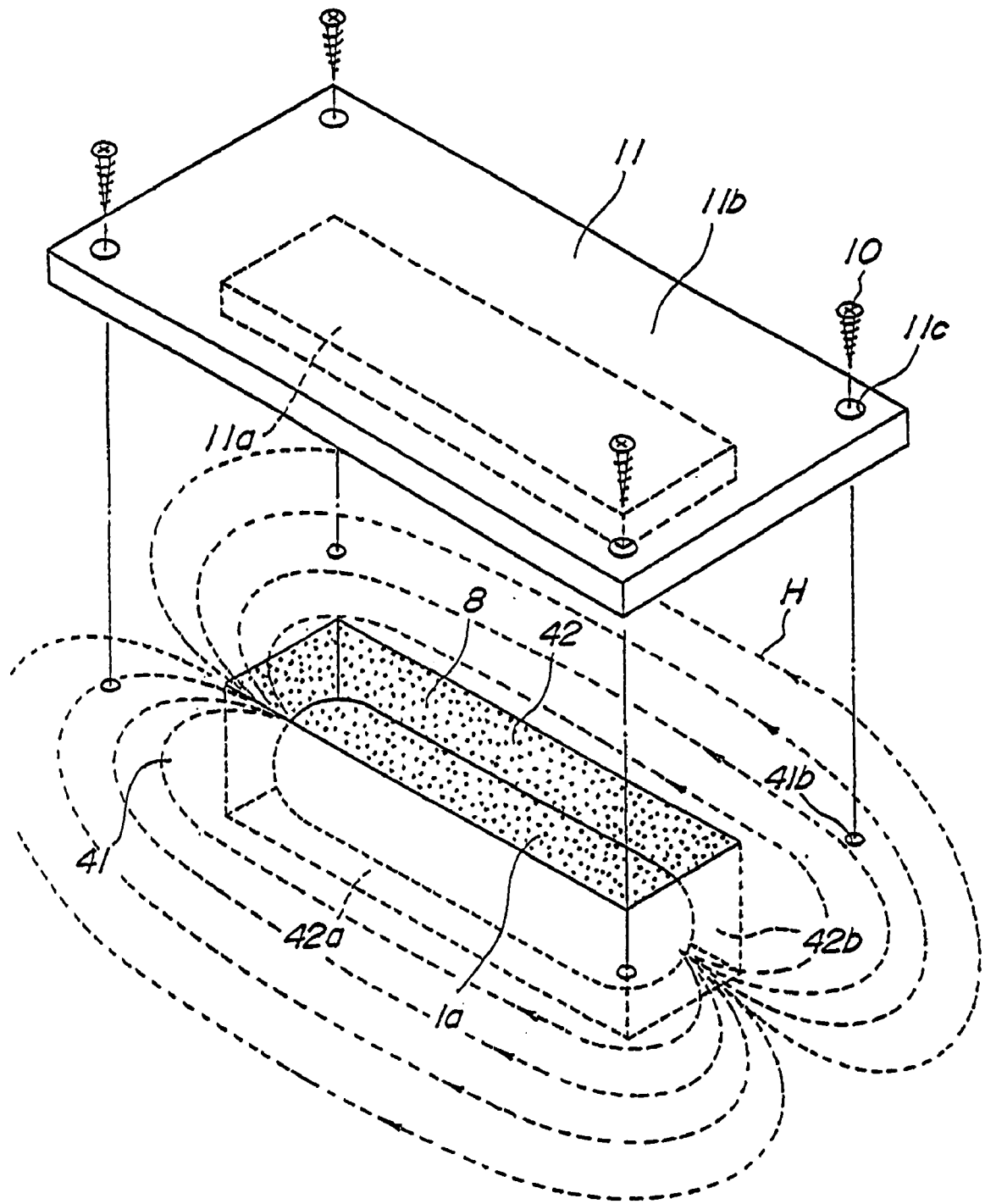
FIG. 17 is an exploded perspective view showing the RFID tag housed in an installation groove of a conductive member and covered with a planar protective member having a projected portion to be engaged with the installation groove.
Figure 18:
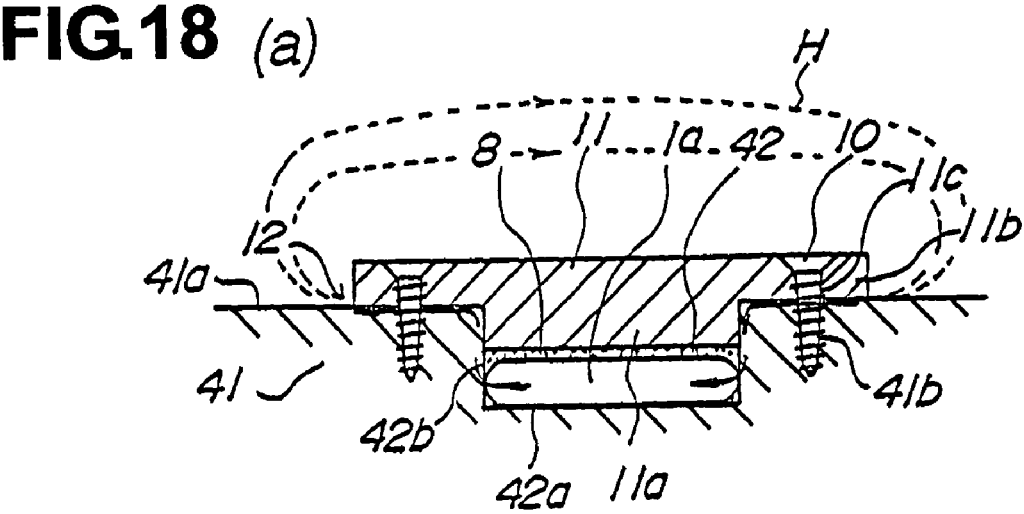
FIGS. 18A to 18C are schematic sectional views showing different modes of fixation of the planar protective member shown in FIG. 17 to the housing portion using various fixing means.
Figure 18:
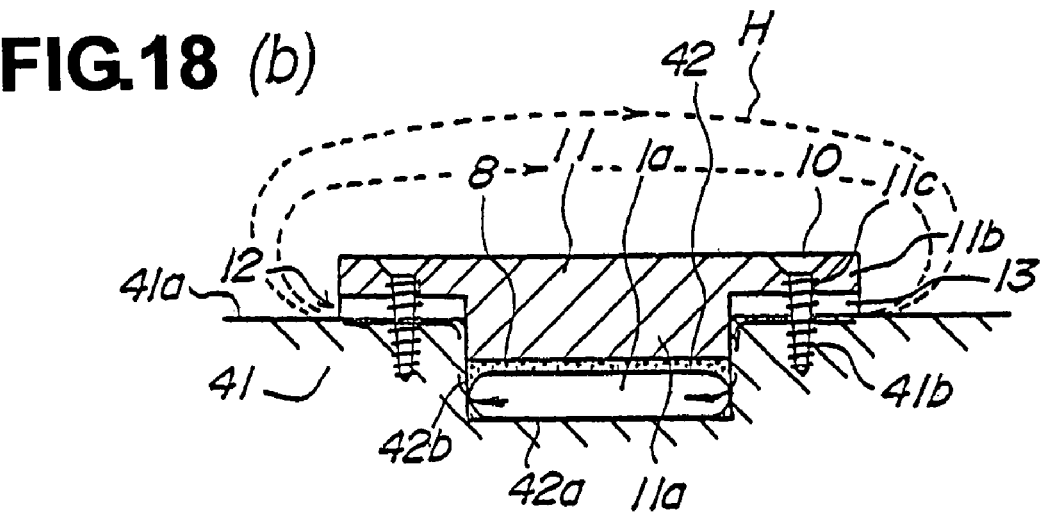
Figure 18:
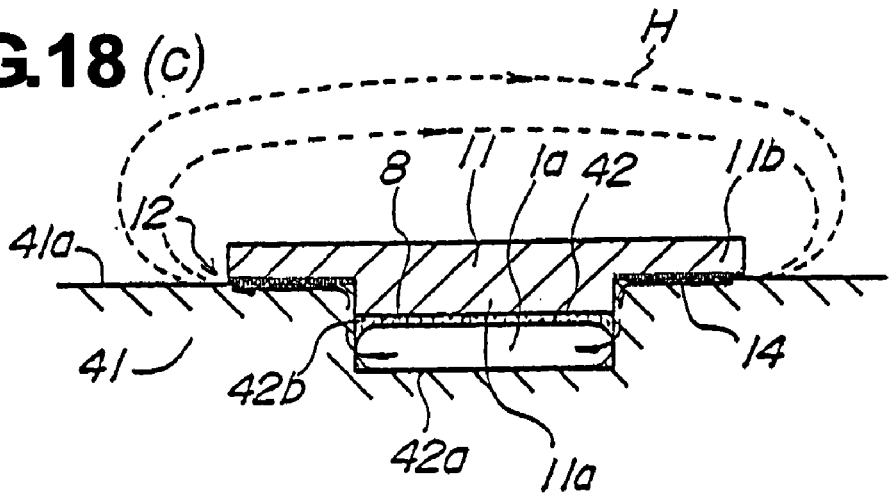

The RFID tag 1a shown in FIG. 17 is formed in a rod shape as a whole and the installation groove 42 is formed to have a square section corresponded in size with the RFID tag 1a. The lid plate 11 has in the central portion thereof an engagement portion 11a having a shape corresponding to that of the installation groove 42 and is provided so as to be projected toward the installation groove 42. The lid plate 11 can properly be positioned by fitting the engagement portion 11a to the installation groove 42, and can be fixed to the conductive member 41 using machine screws 10 by inserting them into through-holes 11c drilled in a flanged portion 11b of such lid plate 11 and by tightening them into tapped holes 41b formed in the conductive member 41. It is now also allowable to fix the lid plate 11 to the conductive member 41 by using tapped machine screws without providing the tapped holes 41b.

The end portion of the antenna coil 2a of the RFID tag 1a and the end portion in the axial direction of the glass container 6 are located in a positional relation defined by a dimensional difference between $L_1$ and $L_2$ listed in Table 1 above, and a resultant predetermined gap, formed between the lateral plane 42b of the installation groove 42 shown in FIGS. 17 and 18A to 18C, and the end portion in the axial direction of the antenna coil 2a facilitates the formation of the magnetic flux loop penetrating such antenna coil 2a, which contributes the formation of the magnetic field H.

As shown in FIG. 18A, the flux leakage path 12 which is responsible for leaking the magnetic flux is formed between the contact planes of the conductive member 41 and the lid plate 11 as a protective member brought into contact and fixed with each other using machine screws 10.

The gap serves as the flux leakage path 12 will be controlled depending on a desired amount of the leakage flux, and will be adjusted by controlling the tightening force of the machine screws 10 or the degree of surface roughness of the contact planes. For the case the flux leakage path 12 is ensured between the roughened planes, the opposing planes come into contact locally at a number of distributed points, and the portion causing no contact can serve as such flux leakage path 12.

Processing either one of the contact planes so as to have a surface roughness of approx. 0.04 μm ensures a gap of approx. 0.08 μm between such contact planes, which allows a desired degree of leakage of the electromagnetic wave.

FIG. 18B shows an exemplary constitution in which the conductive member 41 and the lid plate 11 are fixed using the machine screws 10 while being interposed with a spacer 13 made of a non-conductive material such as rubber or resin, which ensures the flux leakage path 12 having a relatively large thickness.

Interposing the spacer 13 between the lid plate 11 as a protective member and the conductive member 41 is preferable in terms of enhancing the leakage magnetic flux through such non-conductive material layer interposed between the lid plate 11 and the conductive member 41 while ensuring the sealing property.

FIG. 18C shows an exemplary constitution in which the conductive member 41 and the lid plate 11 as a protective member are fixed using the adhesive 14, which makes the separation planes or contact planes approximately flat, and ensures the flux leakage path 12 between such contact planes.

Fixing the lid plate 11 to the conductive member 41 using the adhesive 14 allows a simple fixation, and can enhance the leakage magnetic flux while ensuring the sealing property, since a physical flux leakage path 12 made of a non-conductive material is formed between the conductive member 41 and the lid plate 11.

It is now also allowable to interpose the spacer 13 between the lid plate 11 and the conductive member 41 and adhere the lid plate 11, the spacer 13 and the conductive member 41 together using the adhesive 14.

The present inventors found based on the experimental results that the magnetic field H can propagate by diffraction even out from a narrow gap, and confirmed that mutual send/receive operation of AC magnetic field, which is a medium for power transmission and information communication, is enabled between the RFID tag 1a and an external read/write terminal 9 if the flux leakage path 12 as a fine physical gap is formed so as to allow the magnetic flux to leak therethrough in an amount sufficient for the send/receive operation at a practical level.

The length and the gap width (average gap width) of the flux leakage path 12 may be of minimum values so far as the send/receive operation of the electromagnetic wave is ensured, where a gap width (average gap width) of approx. 0.08 μm (average) will be sufficient.

Composing the lid plate 11, which provides a protective member for covering the top surface side of the RFID tag 1a, using a conductive material, and forming the flux leakage path 12 between the lid plate 11 and the conductive material 41 can make the RFID tag 1a stronger against external stress or impact, and can allow the electromagnetic wave to leak through such flux leakage path 12, which enables the mutual send/receive operation of AC magnetic field, which is a medium for power transmission and information communication, between the RFID tag 1a and the external read/write terminal 9.

The magnetic field H generates as shown in FIGS. 18A to 18C even when the RFID tag 1a is directly installed on the bottom plane 42a of the top-opened installation groove 42 of the conductive member 41 so as to approximately come into contact therewith and is further covered with the lid plate 11 made of a conductive material such as a metal, in which the leakage magnetic flux available through the flux leakage path 12 is responsible for the communication between the RFID tag 1a and the external read/write terminal 9 or the like.

While the installation groove 42 shown in FIG. 17 typically has a square section as corresponded to the lid plate 11, it is also allowable to use the disk-shaped lid plate 11, and to form the round-sectioned installation groove 42 corresponding to such lid plate 11.

The conductive member 41 may be designed in preliminary consideration of the installation groove 42, or the installation groove 42 may be formed by drilling using a drill or so a plurality of holes aligned side by side so as to attain the square section as for the installation groove 42 shown in FIG. 17. Also the round-sectioned installation groove 42 can be formed with ease typically by drilling.

Since the direction of the magnetic flux generated by the antenna coil 2a coincides with the contact planes of the lid plate 11 and the conductive member 41 (lateral direction in FIGS. 18A to 18C), the magnetic flux can effectively propagate by diffraction, which contributes the formation of the magnetic field H over the installation plane.

According to such constitution, a part of the magnetic flux distributes over the bottom plane 42a, or the installation plane of the conductive member 41, leaks out through the flux leakage path 12, and the leakage magnetic flux thus obtained is used for the communication with the external read/write terminal 9.

On the other hand, the magnetic flux emitted from a sender such as the read/write terminal 9 comes through the flux leakage path 12 into the installation groove 42 closed with the lid plate 11 as a protective member, and a part of such magnetic flux is then detected by the antenna coil 2a of the RFID tag 1a.

Hence the RFID tag 1a can communicate with the external even in a state being installed to the conductive member 41 and being protected with the lid plate 11 as a protective member made of a conductive material such as a metal having a large mechanical strength.

Forming the installation groove 42 to the conductive member 41, and installing the RFID tag 1a on the bottom plane 42a, or the installation plane, of such installation groove 42 allow a part of the magnetic flux generated from or directed to the RFID tag 1a to distribute in the space within the installation groove 42, which is responsible for the communication through the flux leakage path 12.

Such constitution allows the RFID tag 1a and the lid plate 11 as the protective member to be installed so as not to project out from the installation groove 42.

Hence, according to the present invention, it is no more necessary, unlike the conventional installation, to ensure a space between the RFID tag 1a and the conductive member 41, or to interpose a spacer or the like made of a non-conductive material, so that the installation groove 42 to be made in the conductive member 41 can be made shallower and the installation structure can be made more simple.

According to such constitution, only a small depth is necessary for the installation groove 42 to be formed in the conductive member 41, which is beneficial in ensuring the strength of the conductive member 41. This is thus advantageous for the case the RFID tag 1a is provided to a thin conductive member 41.

Covering the RFID tag 1a with the lid plate 11 ensures safe retainment of such RFID tag 1a, and can prevent the RFID tag 1a from being undesirably damaged even when impact due to external force is applied to a product having the conductive member 41.

Protecting the RFID tag 1a by filling the installation groove 42 of the conductive member 41 with a shock absorber or heat insulator will effectively ensure safe retainment of such RFID tag 1a and stabilize performances of the RFID tag 1a through stabilizing the temperature.

Beside the fixation of the lid plate 11 using the machine screws 10 or the adhesive 14, it is also allowable to employ a shutter structure which allows open/close operation in a sliding manner, or a hinge mechanism which allows open/close operation in a swinging manner.

Although not shown, the lid plate 11 may comprise a flat plate, and the installation groove 42 of the conductive member 41 may have in the upper portion thereof a step on which the flat lid plate 11 is engaged, to thereby allow both surfaces of the lid plate 11 and the conductive member 41 aligned approximately in the same level without causing any projection.

Or as shown in FIGS. 18A to 18C, it is also allowable to use the lid plate 11 having an engagement portion 11a projected toward the installation groove 42, and drop the lid plate 11 into the installation groove 42 having in the upper portion thereof the step on which the flange portion 11b of such lid plate 11 comes into contact and engaged therewith, where the fixation may be accomplished by screw tightening, insertion of the spacer 13 or adhesion using the adhesive 14.

Although not shown in the drawings, it is also allowable to provide at the center of the lid plate 11 a square box portion which corresponds with the square installation groove 42 of the conductive member 41 but projects upward departing from such installation groove 42, to thereby form a housing space comprising the box portion and the installation groove 42, where the box portion accommodates a part of the RFID tag 1a.

While FIG. 17 shows an exemplary installation groove 42 having a square section corresponding to the square lid plate 11 as a protective member, the lid plate 11 as a protective member may have a disk shape and the installation groove 42 may accordingly have a round section corresponding thereto.

While not shown in the drawings, it is also allowable to compose the conductive member 41 with a flat vertical plane, to install thereon the RFID tag 1a as being housed in a hat-shaped lid plate 11 so as to align the axial direction of such RFID tag 1a normal to the vertical plane of such conductive member 41, and to fix the lid plate 11 to the conductive member 41.

It should now be noted that the conductive member 41 may also have an inclined surface or a curved surface, rather than a horizontal or vertical flat surface.

Figure 19:
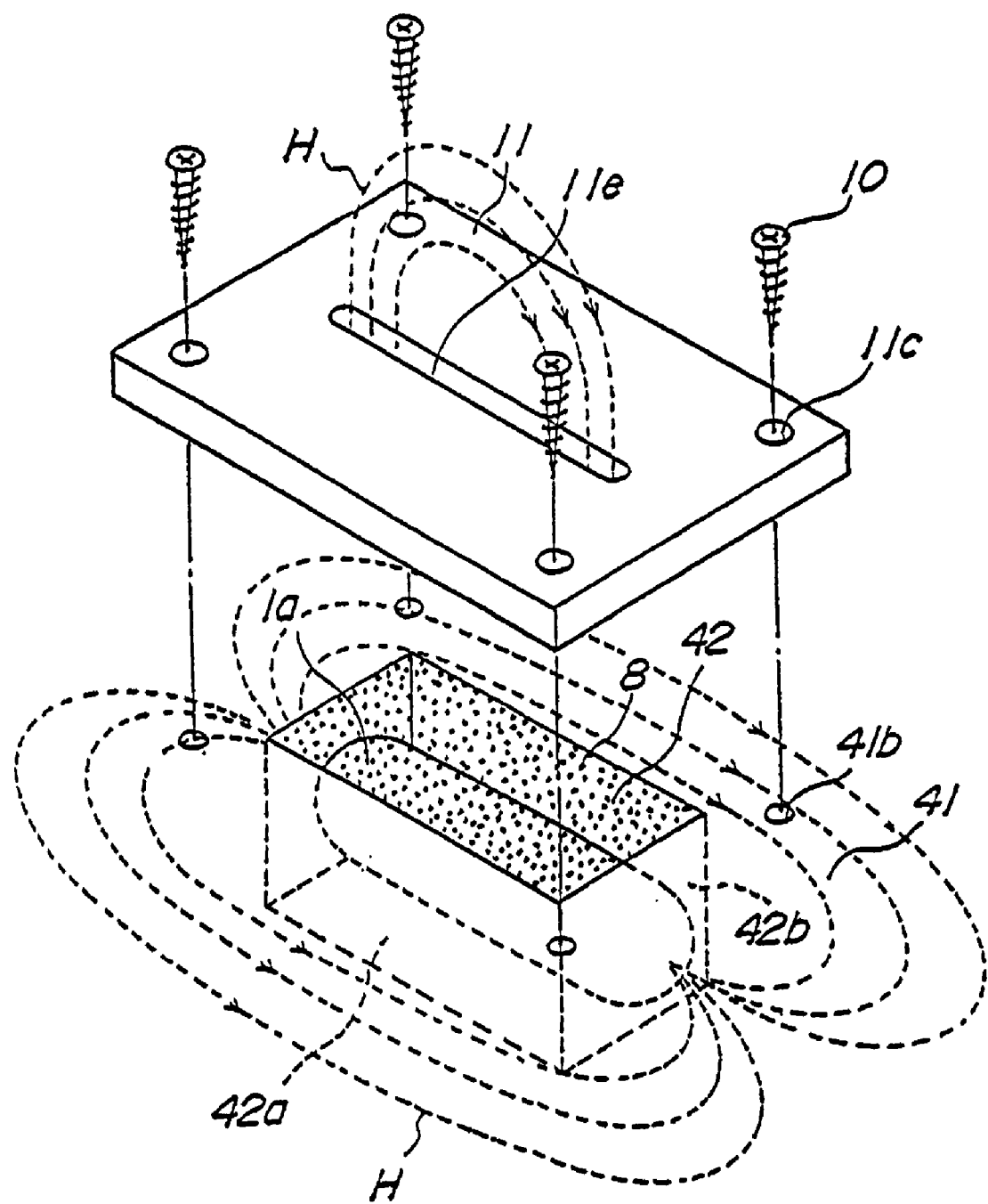
FIG. 19 is an exploded perspective view showing the planar protective member having a straight slit.

FIG. 19 shows an example in which the flat lid plate 11 has a slit 11e which is provided as a through-hole having a length corresponding to the length $L_2$ of the cylindrical antenna coil 2a along the axial direction of the RFID tag 1a having such antenna coil 2a. The slit 11e may be closed with an adhesive or filler made of a non-conductive material.

The magnetic field H can propagate while being diffracted at the edge of the slit 11e provided as the flux leakage path to the lid plate 11, and extends over the bottom plane 42a of the installation groove 42, or the installation plane, which allows the RFID tag 1a to improve efficiency in the send/receive operation of AC magnetic field, a medium for electric power transmission or information communication, with the external read/write terminal 9.

Figure 20:
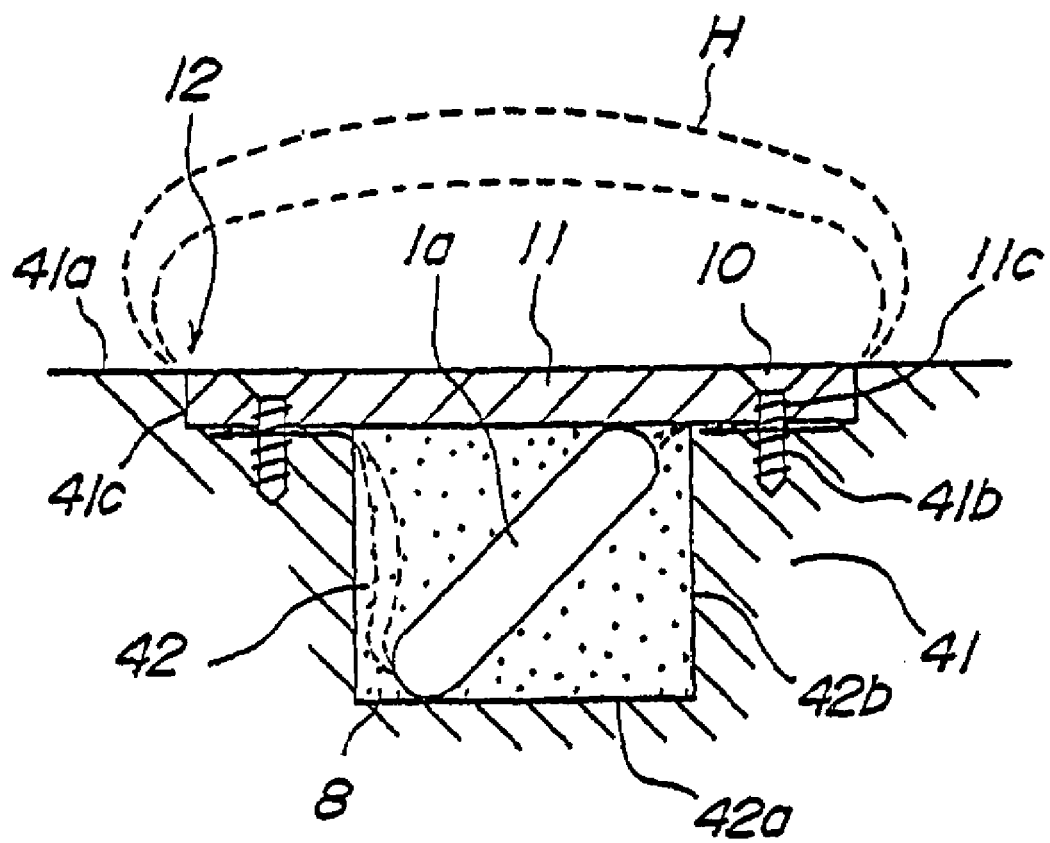
FIG. 20 is a schematic sectional view showing an RFID tag installed so as to align the axial direction of the antenna coil thereof obliquely to the bottom plane of the installation groove.

FIG. 20 shows an exemplary installation in which the rod-shaped RFID tag 1a having the cylindrical antenna coil 2a is installed so as to align the axial direction thereof obliquely to the bottom plane 42a of the installation groove 42 of the conductive member 41.

While not shown in the drawings, it is also allowable to install the RFID tag 1a having the cylindrical antenna coil 2a in a housing space provided to the lid plate 11, while aligning the axial direction of such RFID tag 1a obliquely to the bottom plane 42a of the installation groove 42 in the conductive member 41 or to a flat installation plane of the conductive member 41.

Even with such constitution, a part of the magnetic flux can distribute over the installation plane of the conductive member 41 or in a space over the installation groove 42, and such magnetic flux allows communication through the flux leakage path 12. This is also advantageous in terms of further reducing a projected area of the installation plane or the installation groove 42, which makes an effective use of an installation area available only in a limited range.

Selecting the width of the flux leakage path 12, which is defined by the distance between the contact planes of the conductive member 41 and the lid plate 11, as 0.08 µm or above can enhance diffraction of the leakage magnetic flux to thereby promote the formation of the magnetic field H. Experimental results of the present inventors revealed that the flux leakage path 12 is more efficient when it is formed to have a straight profile, which is possibly obtained by simply fixing a flat lid plate 11 on the conductive member 41 although not shown, rather than the flux leakage path 12 having a cranked profile which is possibly obtained by engaging the engagement portion 11a of the lid plate 11 with the step portion of the conductive member 41 as shown in FIGS. 18A to 18C.

Figure 21:
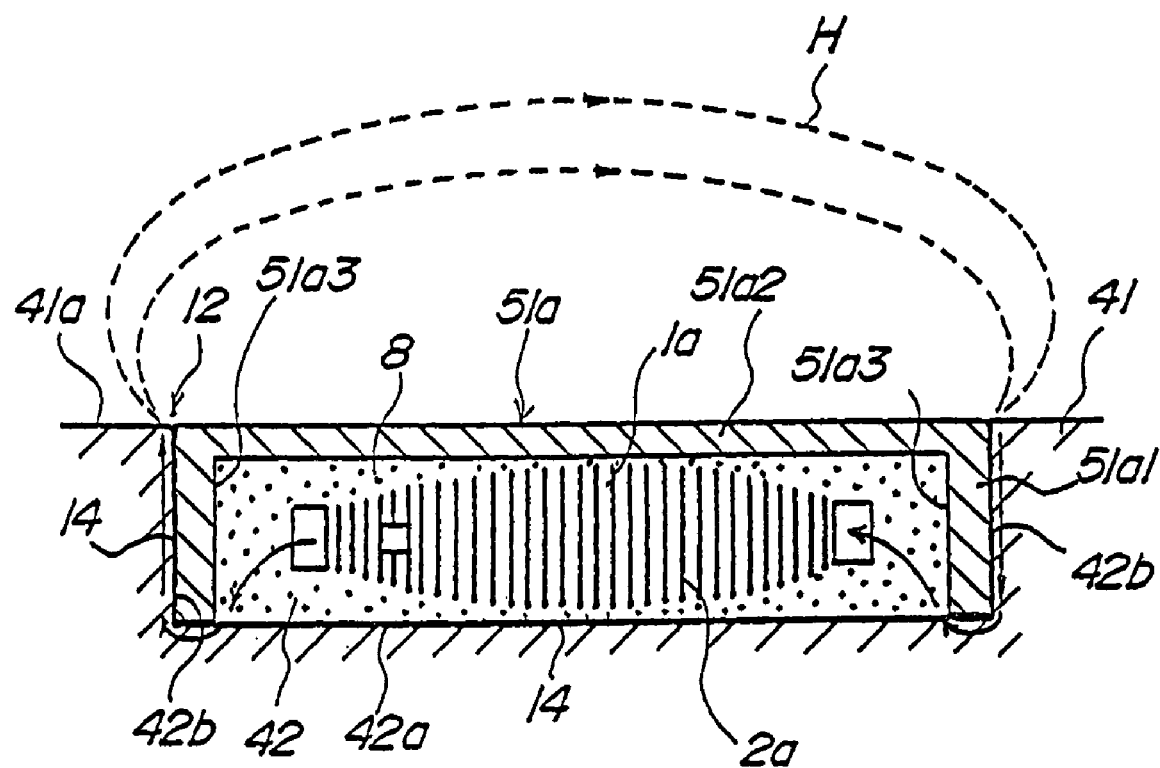
FIG. 21 is a schematic sectional view showing the RFID tag installed in the installation groove of the conductive member and covered with a protective cap having a housing portion for housing the RFID tag.
Figure 22:
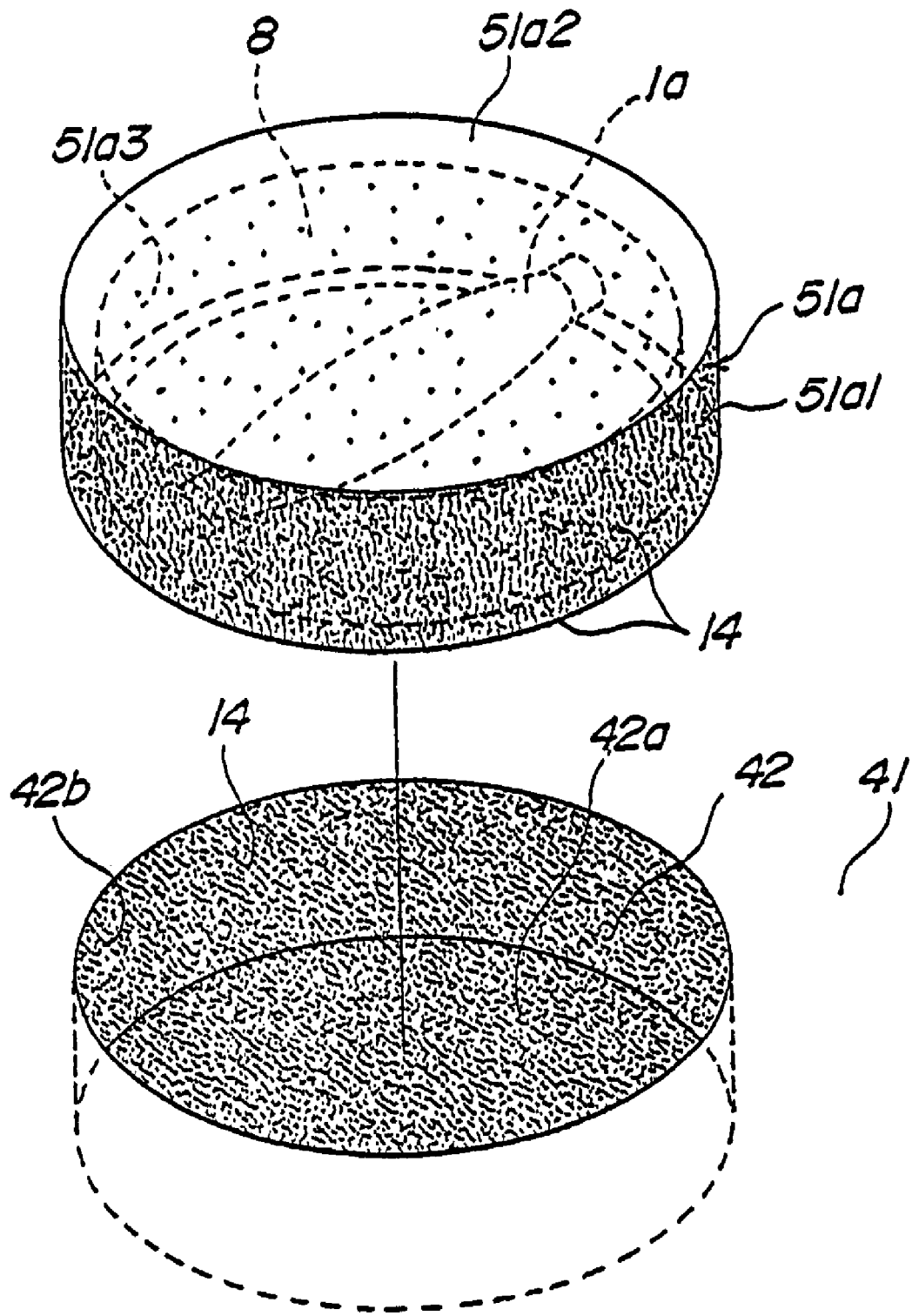
FIG. 22 is an exploded perspective view showing the installation groove and the protective cap individually formed to have a circular section.

The RFID tag 1a having the cylindrical antenna coil 2a shown in FIGS. 21 and 22 is housed in a cap member 51a, as a protective member, which is made of a conductive material such as metal and has a cap shape, and is fixed by molding with a molding material such as the resin 8 or an adhesive.

It is also allowable to provide a non-conductive shock absorber or a heat insulator such as sponge or glass wool in contact with the RFID tag 1a embedded in the cap member 51a.

The cap member 51a housing therein the RFID tag 1a is installed and fixed in the installation groove 42, while covering such RFID tag 1a, so as to oppose the housing space thereof to the bottom plane 42a, or the installation plane, of the installation groove 42 of the conductive member 41.

The cap member 51a shown in FIG. 22 comprises a cylindrical side plate 51a, and a disk-formed ceiling plate $51a_2$, both having a size conformable to the RFID tag 1a, and the installation groove 42 formed in the conductive member 41 is provided so as to have a cylindrical form and a size corresponding with that of the cap member 51a.

The adhesive 14 is applied on the lateral plane and the bottom plane of the cap member 51a, or on the inner plane of the installation groove 42 of the conductive member 41, and the cap member 51a is inserted in the installation groove 42 so as to direct the ceiling plate $51a_2$ thereof to the top surface 41a side of the conductive member 41, to thereby complete the fixation with the adhesive 14.

Although not shown in the drawings, the cap member 51a may be composed of a square side plate $51a_1$ and a square ceiling plate $51a_2$, both having a size conformable to the RFID tag 1a, and the installation groove 42 formed in the conductive member 41 may be provided so as to have a square form and a size corresponding with that of the cap member 51a.

The adhesive 14 may be applied to a part of at least either one of the cap member 51a or inner plane of the installation groove 42 of the conductive member 41.

FIG. 21 shows the RFID tag 1b housed in the cap member 51a and embedded in the installation groove 42 of the conductive member 41 as being covered with such cap member 51a, together with a profile of the magnetic field H which is formed by the leakage magnetic flux generated from such RFID tag 1a and extends over the bottom plane 42a, or the installation plane, of the installation groove 42.

A predetermined gap is formed between the end portion in the axial direction of the antenna coil 2a of the RFID tag 1a and the inner plane $51a_3$ of the side plate $51a_1$ of the cap member 51a, which facilitates formation of the magnetic flux penetrating the antenna coil 2a and accordingly the formation of magnetic field H.

The leakage magnetic flux leaks through the flux leakage path 12 formed at the contact planes of the installation groove 42 of the conductive member 41 and the cap member 51a can diffract to form the magnetic field H which propagates over the bottom plane 42a, or the installation plane, of the installation groove 42. This enables mutual send/receive of AC magnetic field, which is a medium for power transmission and information communication, between the RFID tag 1a and the external read/write terminal 9 or so.

The magnetic field H also generates over the bottom plane 42a of the installation groove 42 in the conductive member 41 as shown in FIG. 21, even when the RFID tag 1a is installed on the bottom plane 42a of the installation groove 42 in the conductive member 41 so as to approximately come into contact therewith, and is further covered on the top surface portion thereof with the cap member 51a.

It is also allowable to interpose a spacer made of a non-conductive material such as rubber or resin between the cap member 51a and the conductive member 41, although not shown. Interposing the spacer between the cap member 51a and conductive member 41 is preferable in terms of enhancing the leakage magnetic flux through such non-conductive material layer interposed between the conductive member 41 and the cap member 51a while ensuring the sealing property.

For the case that the spacer is interposed between the cap member 51a and the conductive member 41, the adhesive 14 may be provided between the spacer and the conductive member 41, and between the spacer and the cap member 51a, respectively, to thereby complete the fixation.

Fixing the cap member 51a to the conductive member 41 using the adhesive 14 allows a simple fixation, and can enhance the leakage magnetic flux while ensuring the sealing property, since the flux leakage path 12 filled with a non-conductive material is formed between the conductive member 41 and the cap member 51a. This is advantageous in sending or receiving AC magnetic field, which is a medium for power transmission and information communication, between the RFID tag 1a and the external read/write terminal 9 or so.

Since the flux leakage path 12 is designed to have a width of 0.08 µm or above, which is defined by the distance between the contact planes of the cap member 51a and the conductive member 41, so that the leakage magnetic flux can effectively propagate by diffraction and allows the magnetic field H to be formed over the bottom plane 42a, or the installation plane, of the installation groove 42, which enables send/receive operation of electric power or signals.

According to such constitution, only a small depth is necessary for the installation groove 42 to be formed in the conductive member 41, which is beneficial in ensuring the strength of the conductive member 41. This is thus advantageous for the case the RFID tag 1a is provided to a thin conductive member 41.

Hence, it is no more necessary, unlike the conventional installation, to ensure a space between the RFID tag 1a and the conductive member 41, or to interpose a spacer or the like made of a non-conductive material, so that the installation groove 42 to be made in the conductive member 41 can be made shallower and the installation structure can be more simple.

Covering the RFID tag 1a with the lid plate 11 ensures safe retainment of such RFID tag 1a, and can prevent the RFID tag 1a from being undesirably damaged even when impact due to external force is applied to a product having the conductive member 41.

Protecting the RFID tag 1a by filling the housing space in the cap member 51a with a shock absorber or heat insulator will effectively ensure safe retainment of such RFID tag 1a and stabilize performances of the RFID tag 1a through stabilizing the temperature.

Figure 23:
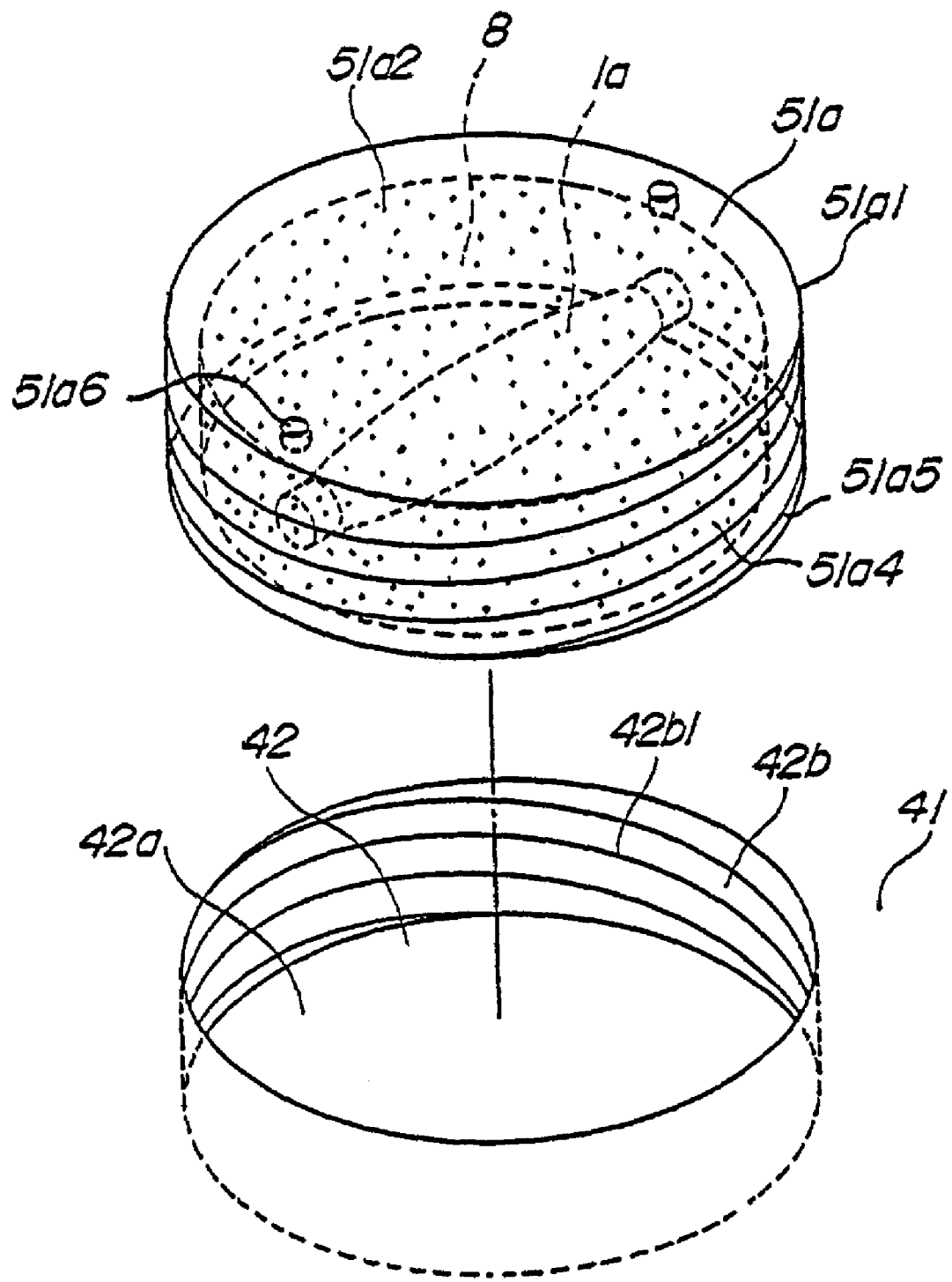
FIG. 23 is an exploded perspective view showing an exemplary fixing means by which the protective cap is attached to the installation groove of the conductive member by screw engagement.

In the embodiment shown in FIG. 23, the cap member 51a has on the outer wall plane $51a_4$ of the side plate $51a_1$ thereof a threaded portion $51a_5$, and the installation groove 42 in the conductive member 41 has on the side plane 42 thereof a threaded portion $42b_1$.

In such constitution, the RFID tag 1a is housed in the housing space of the cap member 51a and fixed by molding with a molding material such as the resin 8, and the cap member 51a is then attached and fixed in the installation groove 42 by engaging the threaded portion $51a_5$ of such cap member 51a with the threaded portion $42b_1$ of the installation groove 42, in which the housing space of the cap member 51a housing the RFID tag 1a is opposed to the bottom plane 42a, or the installation plane, of the installation groove in the conductive member 41.

The ceiling plate $51a_2$ of the cap member 51a has on the top surface thereof engagement holes $51a_6$, with which a tightening jig, not shown, is engaged to rotate and tighten the cap member 51a so as to be fixed to the conductive member 41.

The fixation by tightening in this embodiment is accomplished by engaging the threaded portion $51a_5$ of the cap member 51a with the threaded portion $42b_1$ of the installation groove 42, where the flux leakage path 12 is designed to have a width of 0.08 µm or above, which is defined by the distance between the contact planes of the threaded portions $42b_1$ and $51a_5$. Thus the leakage magnetic flux can effectively propagate by diffraction and allows the magnetic field H to be formed over the bottom plane 42a, or the installation plane, of the installation groove 42, which enables send/receive operation of electric power or signals to or from the external read/write terminal 9 or so.

Figure 24:
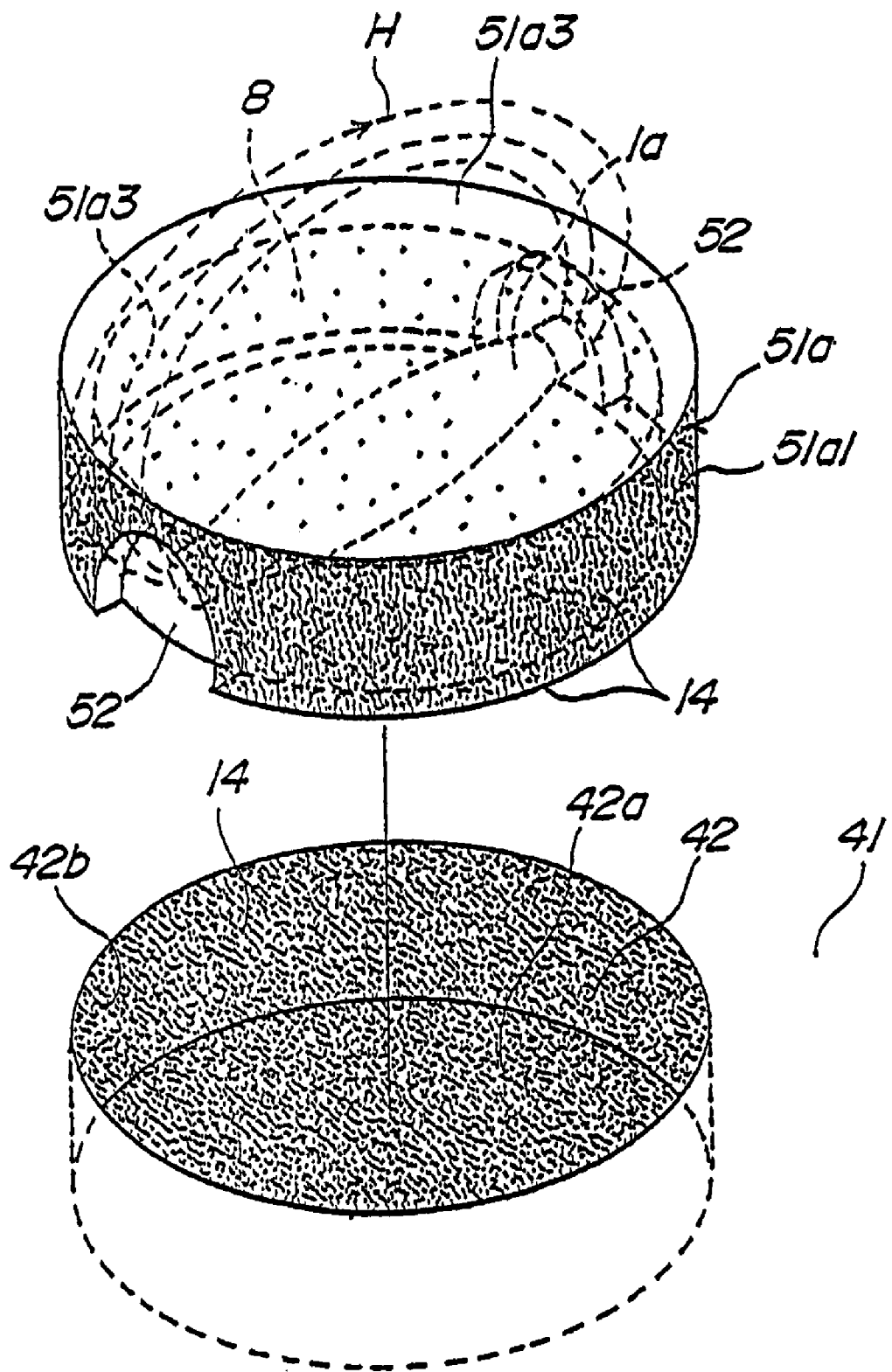
FIG. 24 is an exploded perspective view showing an exemplary round-sectioned protective cap having notches aligned in the axial direction of a cylindrical antenna coil.
Figure 25:
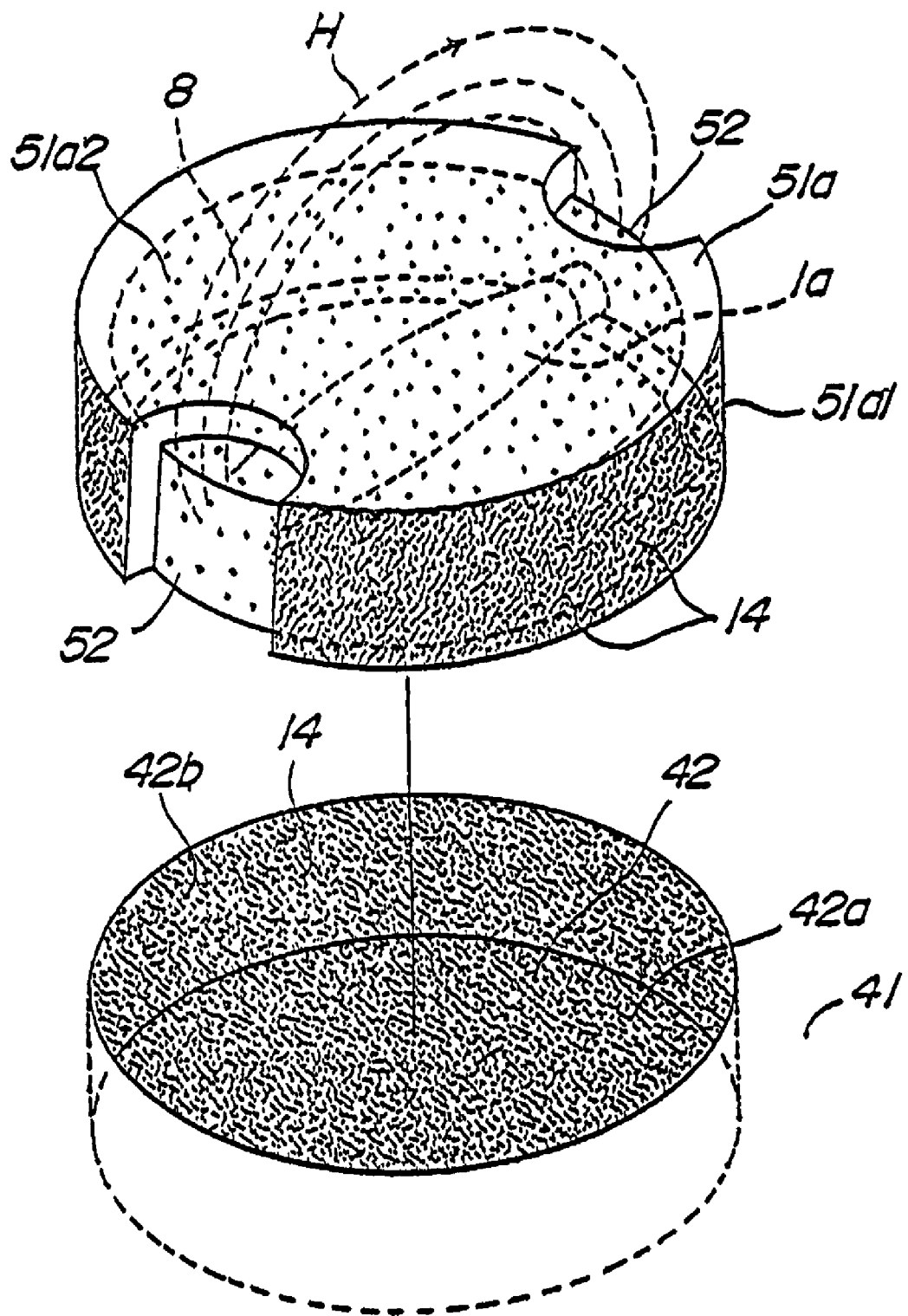
FIG. 25 is an exploded perspective view showing an exemplary round-sectioned protective cap having L-sectioned notches extending toward the ceiling thereof aligned in the axial direction of a cylindrical antenna coil.

FIGS. 24 and 25 show the cap members 51a having slits 52 for enhancing leakage magnetic flux, which were formed by notching the side plate $51a_1$ or in addition the ceiling plate $51a_2$ thereof in the portions corresponding with the end portions in the axial direction of the cylindrical antenna coil 2a.

FIG. 24 shows an exemplary cap member 51a having semicircular slits 52 on the cylindrical side plate $51a_1$ thereof, and FIG. 25 shows an exemplary cap member 51a having approximately semicylindrical slits 52 formed in the region extending from the side plate $51a_1$ to the ceiling plate $51a_2$.

Although not shown, the square cap member 51*a* may have square slits 52 on the side plate 51*a*$_1$ thereof, or L-sectioned slits 52 in the region extending from the side plate 51*a*$_1$ to the ceiling plate 51*a*$_2$.

Geometry and dimension of the slits 52 can arbitrarily be selected insofar as the leakage magnetic flux can be enhanced and the cap member 51*a* can keep a proper strength.

According to such constitution, the slits 52 in the side plates 51*a*$_1$ and the ceiling plate 51*a*$_2$ can further enhance the leakage of the magnetic flux by diffraction and thus allow the magnetic field H to be formed over the bottom plane 42*a*, or the installation plane, of the installation groove 42, to thereby promote send/receive operation of AC magnetic field, a medium for power transmission or information communication, between the electromagnetic induction tag 1*a* and an external reader/writer terminal 9 or so.

Figure 26:
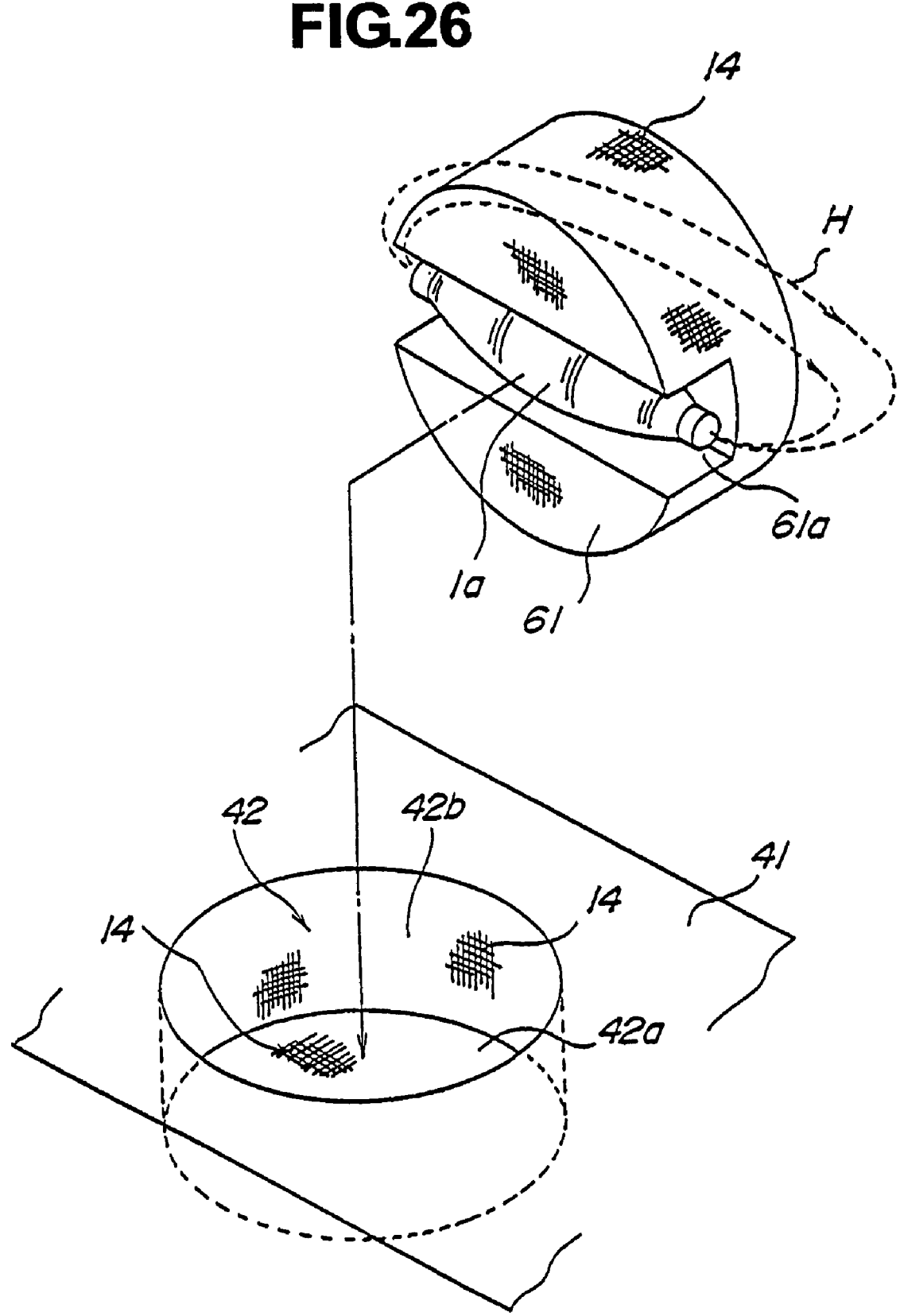
FIG. 26 is an exploded perspective view showing an exemplary attachment in which an RFID tag is housed in a housing portion of a block and such block is attached within an installation groove so as to oppose the housing portion to the installation plane.

FIG. 26 shows a cylindrical block member 61 as an exemplary protective member made of a conductive material such as a metal, which has on the surface thereof a straight groove 61*a* for housing the RFID tag 1*a*. The block member 61 is installed in the installation groove 42 so as to oppose the groove 61 thereof to the bottom plane 42*a*, or the installation plane, of the installation groove 42 in the conductive member 41, and so as to direct the axial direction of the RFID tag 1*a* in parallel to such bottom plane 42*a*.

In such case, the adhesive 14 is previously applied to the side and bottom planes of the block member 61, or inner plane of the installation groove 42 in the conductive member 41, and the cap member 61 is then inserted into the installation groove 42 to thereby complete the fixation with the aid of the adhesive 14.

Installing the RFID tag 1*a* to the installation groove 42 in the conductive member 41 while being housed in the groove 61*a* of the block member 61 allows exact positioning of such RFID tag 1*a* and facilitates the operation required.

Although not shown in the drawings, the RFID tag 1*a* may directly be installed in the installation groove 42 of other various shapes, or may be housed in the block member 61 of other various shapes and such block member 61 may be inserted and fixed in the installation groove 42 having a shape conformable thereto.

Next, the installation structure and communication method will be explained referring to FIGS. 27 to 29B in which the RFID tag 1*b* having the concentric disk-shaped antenna coil 2*b* is installed to the conductive member 41. It should now be noted that constitutions similar to those explained in the foregoing case with the RFID tag 1*a* having the cylindrical antenna coil 2*a* will be assigned with the same reference numerals, while omitting the explanations thereof.

As shown in FIG. 27, the conductive member 41 has the installation groove 42 having a round section corresponded in size with the RFID tag 1*b* having a concentric disk-shaped antenna coil 2*b*, such RFID tag 1*b* is installed on the bottom plane 42*a*, or the installation plane, of the conductive member 41 so as to direct the antenna coil plane thereof in parallel to such bottom plane 42*a*, and the flux leakage path 12 is formed between the conductive member 41 and the lid plate 11 as an exemplary protective member made of a conductive material such as a metal.

The lid plate 11 as an exemplary protective member, shown in FIGS. 27 and 28, has in the center portion thereof the cylindrical engagement portion 11*a* having a shape conformable to that of the installation groove 42 and projected toward such installation groove 42. The lid plate 11 can properly be positioned by fitting the engagement portion 11*a* to the installation groove 42, and can be fixed to the conductive member 41 using machine screws 10 by inserting them into through-holes 11*c* drilled in a flanged portion 11*b* of such lid plate 11 and by tightening them into tapped holes 41*b* formed in the conductive member 41. It is now also allowable to fix the lid plate 11 to the conductive member 41 by using tapped machine screws without providing the tapped holes 41*b*.

FIG. 28 shows the RFID tag 1*b* embedded in the installation groove 42, together with a profile of the magnetic field H generated around such RFID tag 1*b*.

Although not shown, the lid plate 11 may comprise a flat plate, and the installation groove 42 in the conductive member 41 may have in the upper portion thereof a step on which the flat lid plate 11 is engaged, to thereby allow both surfaces of the lid plate 11 and the conductive member 41 aligned approximately in the same level without causing any projection.

It is also allowable to provide at the center of the disk-shaped lid plate 11 a cylindrical box portion which corresponds with the round-sectioned installation groove 42 in the conductive member 41 but projects upward departing from such installation groove 42, to thereby form a housing space comprising the box portion and the installation groove 42, in which the RFID tag 1*a* is housed so as to be covered with such lid plate 11.

FIG. 29A shows an example in which the disk-shaped lid plate 11 has slits 11*e* which are provided as the flux leakage path 12 individually having a length corresponding to the outer diameter $D_4$ of the concentric disk-shaped antenna coil 2*b* along the radial direction of the electromagnetic induction tag 1*b* having such antenna coil 2*b*, and crossed at the position corresponding to the center of the antenna coil 2*b*. The slits 11*e* may also be closed with an adhesive or filler made of a non-conductive material.

FIG. 29B shows an example in which the metal member 11 has a single slit 11*e* as the flux leakage path 12 along the radial direction of the antenna coil 2*b*. The slit 11*e* may also be closed with an adhesive or filler made of a non-conductive material.

The magnetic flux generated from the RFID tag 1*b* having the concentric. disk-shaped antenna coil 2*b* can propagate through the flux leakage path 12 or the slit(s) 11*e* provided as the flux leakage path, and diffracts thereat to form the magnetic field H over the installation plane of the conductive member 41, which allows the RFID tag 1*b* to send or receive AC magnetic field, a medium for electric power transmission or information communication, to or from the external read/write terminal 9.

Beside screw driving or adhesion, the fixation of the foregoing lid plate 11, cap member 51*a* or the block member 61 to the conductive member 41 can also be accomplished by engagement, caulking, screw engagement; seam joining or tacking so as to allow a magnetic flux to leak out from the flux leakage path in an amount sufficient for ensuring practical send/receive operation. Seam joining can be effected by joining metal plates with a high density polyethylene layer or the like and rolling up the joint portion en bloc.

Figure 30:
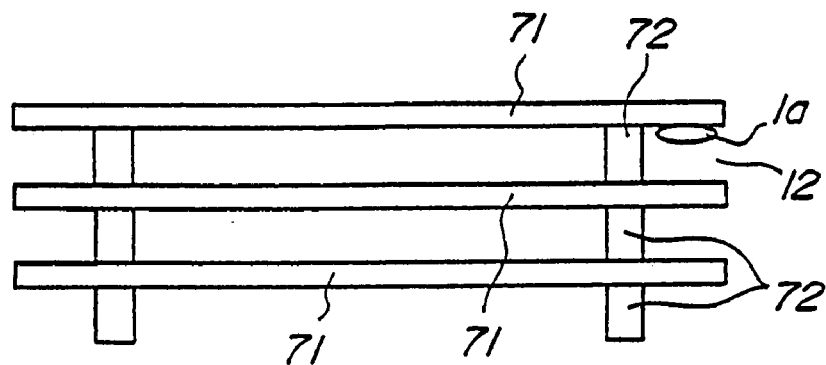
FIGS. 30A and 30B are a side view and a perspective view, respectively, explaining an exemplary application of a method of the present invention for fetching information from an RFID tag attached to a stack of a plurality of steel sheets.
Figure 30:
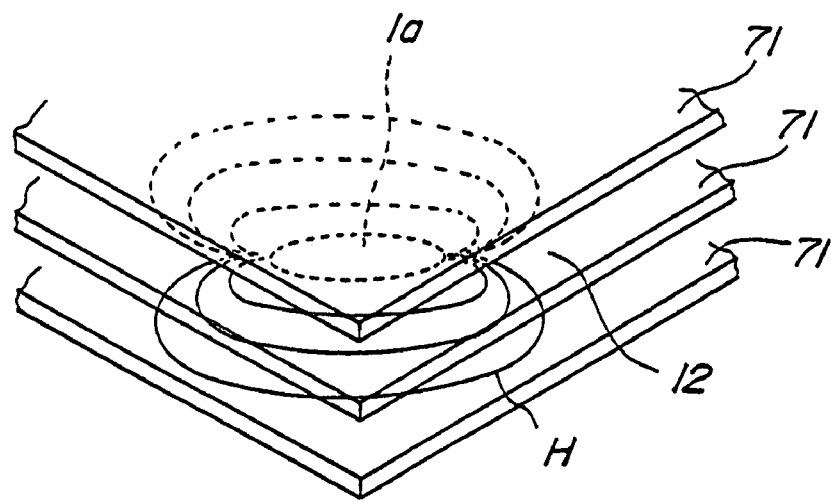

FIGS. 30A and 30B are a side view and a perspective view, respectively, explaining the communication method of the present invention in which the RFID tag is installed to a stack of a plurality of steel sheets.

In FIGS. 30A and 30B, a plurality of flat steel sheets 71, provided as a plurality of planar conductive members, are stacked with each other while being interposed with battens 72, the RFID tag 1*a* having the cylindrical antenna coil 2*b* is fixed on one of such steel sheets 71, and the flux leakage path 12 is formed between the adjacent steel sheets 71. This allows the communication between the RFID tag 1*a* and the read/write terminal 9 or so provided independent of the stacked steel sheets 71.

The RFID tag 1*a* may be fixed on the steel sheet 71 typically with an adhesive or a tacking agent made of a non-conductive material, or may be magnetically attached thereto with the aid of a magnet held by such RFID tag 1*a*.

The RFID tag 1*a* is preferably fixed at the corner of the steel sheet 71 so as to obliquely align the axial direction thereof (typically 45° declined from the edge). The flux leakage path 12 comprising the gap between the adjacent steel sheets 71 is opened at both ends along the axial direction of the antenna coil 2*a* of the RFID tag 1*a*, which facilitates the formation of magnetic flux penetrating the antenna coil 2*a*, to thereby helps the formation of the magnetic field H.

The magnetic field H can propagate out from the flux leakage path 12 formed between the adjacent steel sheets 71, and the leakage magnetic flux obtained therefrom can mediate mutual send/receive of an AC magnetic field, a medium for electric power transmission and information communication, between the RFID tag 1*a* and the external read/write terminal 9, to thereby fetch information stored in such RFID tag 1*a*.

For example, the present invention is similarly applicable also to a gently curved sheet or corrugated sheet, beside the foregoing flat steel sheet 71. Possible examples of such of planar conductive members to be stacked in a plural number include printed circuit board having formed thereon electric circuits made of copper foil; various sheet-formed metal parts made of various metals such as aluminum, copper or stainless steel; sheet-formed materials made of resin, cement or concrete compounded with a magnetic material such as iron powder or the like; sheet-formed materials such as cloth incorporating or adhering a magnetic material such as iron powder or the like; and sheet-formed commodities made of magnetic material such as magnet. Stacking a plurality of such sheet-formed commodities and providing the RFID tag 1*a* so as to face to the space formed between the adjacent sheet-formed commodities allows fetching of information stored in the RFID tag 1*a*, to thereby ensure simple and efficient product management or inventory management.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A housing structure for an RFID tag in which an RFID tag formed in a rod shape as a whole having a cylindrical antenna coil and a control section is housed in a container made of a conductive member and comprised of separable members contacting with each other by separation planes thereof, and in which said container has a flux leakage path on the separation planes for communication with electromagnetic wave by ASK (Amplitude Shift Keying) method between the RFID tag and the exterior of the container, wherein the flux leakage path extends from the vicinity of a tip of the RFID tag housed in the container to the exterior of the container.

2. The housing structure for an RFID tag as claimed in claim 1, wherein said separable members composing said container are a main housing portion having an opening and a lid portion capable of closing such opening, and said lid portion is fixed to said housing portion with a fixing means.

3. The housing structure for an RFID tag as claimed in claim 2, wherein said lid portion is fixed to said housing portion with said fixing means while being interposed with a spacer made of a non-conductive material.

4. The housing structure for an RFID tag as claimed in claim 1, wherein a shock absorber or a heat insulator made of a non-conducive material is provided in contact with said RFID tag.

5. The housing structure for an RFID tag as claimed in claim 1, wherein said separable members are connected with each other using an opening/closing means so as to allow open/close operation.

6. The housing structure for an RFID tag in which said housing structure for an RFID tag as claimed in claim 1 is installed on an installation plane of a conductive member.

7. An installation structure for an RFID tag in which a conductive member is formed with an installation groove and in which an RFID tag formed in a rod shape as a whole having a cylindrical antenna coil and a control section is installed in the installation groove,
   wherein the axial direction of the RFID tag is, under this situation, installed in parallel to the bottom plane of the installation groove,
   wherein the surface side of the RFID tag is covered with a protective member made of a conductive material,
   wherein a flux leakage path made of separation planes of the conductive member and the protective member is formed for communication with electromagnetic wave by ASK (Amplitude Shift Keying) method between the RFID tag and the exterior of the container, and wherein the flux leakage path extends from the vicinity of a tip of the RFID tag housed in the container to the exterior of the protective member.

8. The installation structure for an RFID tag as claimed in claim 7, wherein said protective member is formed in a plate or cap.

9. The installation structure for an RFID tag as claimed in claim 7, wherein said protective member is composed of a block material having in the surface portion thereof a housing portion, and is set, where housing in such housing portion said RFID tag, in said installation groove so as to oppose the housing portion of the protective member to the installation plane of said conductive member.

10. The installation structure for an RFID tag as claimed in claim 7, wherein said protective member is fixed to said conductive member with a fixing means.

11. The installation structure for an RFID tag as claimed in claim 10, wherein said protective member is fixed to said conductive material with said fixing means while being interposed with a spacer made of a non-conductive material.

12. The installation structure for an RFID tag as claimed in claim 7, wherein a shock absorber or a heat insulator made of a non-conducive material is provided in contact with said RFID tag.

13. A communication method using an RFID tag formed in a rod shape as a whole having a cylindrical antenna coil and a control section, as being surrounded by a conductive member and comprised of separable members contacting with each other by separation planes thereof, wherein said conductive member is provided with a flux leakage path made of a narrow gap is formed for communication with electromagnetic wave by ASK (Amplitude Shift Keying) method between the RFID tag and the exterior of the container, and wherein the flux leakage path extends from the vicinity of a tip of the RFID tag housed in the conductive member to the exterior of the protective member, wherein communication is performed between said RFID tag and the exterior of the conductive member in utilizing leaked magnetic flux passing through the flux leakage path.

14. The communication method using an RFID tag as claimed in claim 13, wherein said RFID tag is housed in a housing portion formed in a surface portion of a protective member made of a conductive block, and said protective member is installed in an installation groove so as to direct said housing portion to the bottom plane of said installation groove.

15. The housing structure for an RFID tag as claimed in claim 1, wherein the axial direction of the RFID tag is arranged in parallel to the separation planes.

16. The housing structure for an RFID tag as claimed in claim 6, wherein the axial direction of the RFID tag is arranged in parallel to the separation planes.

17. The housing structure for an RFID tag as claimed in claim 7, wherein the axial direction of the RFID tag is arranged in parallel to the separation planes.

18. A communication method for external communication by using an RFID tag formed in a rod shape as a whole having a cylindrical antenna coil and installed in an installation groove in a conductive material, the RFID tag being housed in a container, wherein the axial direction of the installed RFID tag is, parallel to a bottom plane of the installation groove, wherein a surface of the RFID tag is covered with a protective member made of a conductive material, wherein a flux leakage path made of a narrow gap is formed for communication with electromagnetic wave by ASK (Amplitude Shift Keying) method between the RFID tag and the exterior of the container, and wherein the flux leakage path extends from the vicinity of a tip of the RFID tag housed in the container to the exterior of the protective member, and wherein communication is performed between the RFID tag and the exterior of the protective member in utilizing the flux leakage path.

19. The communication method using an RFID tag as claimed in claim 17, wherein the RFID tag is surrounded by a conductive member comprising an installation member and the protective member, so as to allow the communication between the RFID tag and the exterior of the protective member using magnetic flux leaks through said flux leakage path provided between separation planes of the installation member and the protective member.

* * * * *